(12) United States Patent
Sato et al.

(10) Patent No.: US 7,830,113 B2
(45) Date of Patent: Nov. 9, 2010

(54) SEMICONDUCTOR DEVICE, COMMUNICATION SYSTEM, AND METHOD OF CHARGING THE SEMICONDUCTOR DEVICE

(75) Inventors: Takehisa Sato, Isehara (JP); Takeshi Osada, Isehara (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 382 days.

(21) Appl. No.: 11/987,049

(22) Filed: Nov. 27, 2007

(65) Prior Publication Data

US 2008/0122401 A1    May 29, 2008

(30) Foreign Application Priority Data

Nov. 28, 2006    (JP) .............................. 2006-320469

(51) Int. Cl.
*H02J 7/00* (2006.01)
(52) U.S. Cl. ..................... 320/107; 320/108; 320/128
(58) Field of Classification Search ................ 320/106, 320/107, 108, 113, 115, 128; 307/17, 104, 307/107; 702/62, 63, 64; 235/487, 492
See application file for complete search history.

(56) References Cited

U.S. PATENT DOCUMENTS

| 5,521,601 A | | 5/1996 | Kandlur et al. |
| 5,929,778 A | | 7/1999 | Asama et al. |
| 6,079,619 A | * | 6/2000 | Teraura et al. ............. 235/380 |
| 6,223,990 B1 | * | 5/2001 | Kamei ....................... 235/492 |
| 6,447,448 B1 | * | 9/2002 | Ishikawa et al. ............. 600/300 |
| 6,809,952 B2 | * | 10/2004 | Masui ........................ 365/145 |
| 7,327,201 B2 | * | 2/2008 | Miyashita et al. ........... 331/185 |
| 2003/0231106 A1 | | 12/2003 | Shafer |
| 2005/0134435 A1 | * | 6/2005 | Koyama et al. .......... 340/10.34 |
| 2005/0137648 A1 | * | 6/2005 | Cosendai et al. ............. 607/48 |
| 2006/0289645 A1 | * | 12/2006 | Schuessler ................ 235/451 |
| 2007/0057073 A1 | * | 3/2007 | Mamba et al. .............. 235/492 |
| 2007/0216348 A1 | | 9/2007 | Shionoiri et al. |
| 2007/0229228 A1 | | 10/2007 | Yamazaki et al. |
| 2007/0229279 A1 | | 10/2007 | Yamazaki et al. |
| 2007/0229281 A1 | | 10/2007 | Shionoiri et al. |

FOREIGN PATENT DOCUMENTS

| JP | 10-014126 | 1/1998 |
| JP | 2003-309490 | 10/2003 |

* cited by examiner

*Primary Examiner*—Edward Tso
*Assistant Examiner*—M'Baye Diao
(74) *Attorney, Agent, or Firm*—Eric J. Robinson; Robinson Intellectual Property Law Office, P.C.

(57) ABSTRACT

An object of the present invention to provide a semiconductor device including a battery that can be wirelessly charged, in which the battery can be charged even when the semiconductor device is not put close to a power feeder. Such a semiconductor device has a structure including an antenna circuit, a communication control circuit to conduct wireless communication via the antenna circuit, a battery to be charged with electric power which is externally wirelessly fed via the antenna circuit, and an oscillator circuit to wirelessly feed electric power via the antenna circuit. In addition, the battery in the semiconductor device is wirelessly charged and the semiconductor device externally feeds electric power wirelessly to a chargeable battery in another semiconductor device.

16 Claims, 24 Drawing Sheets

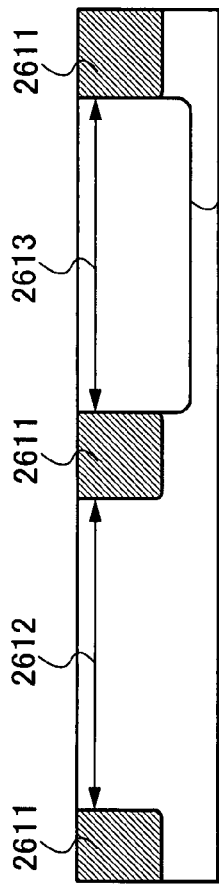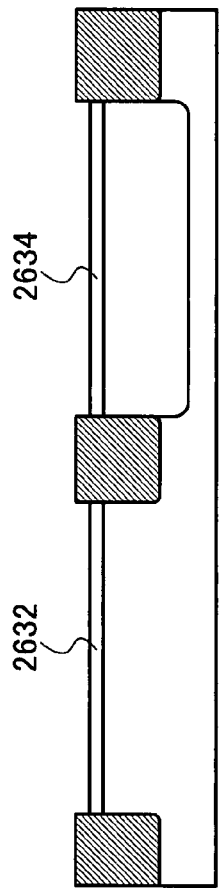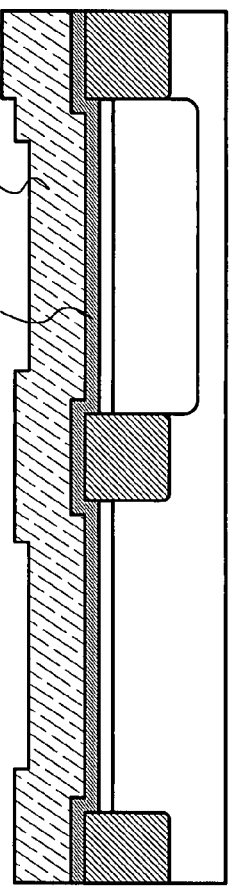

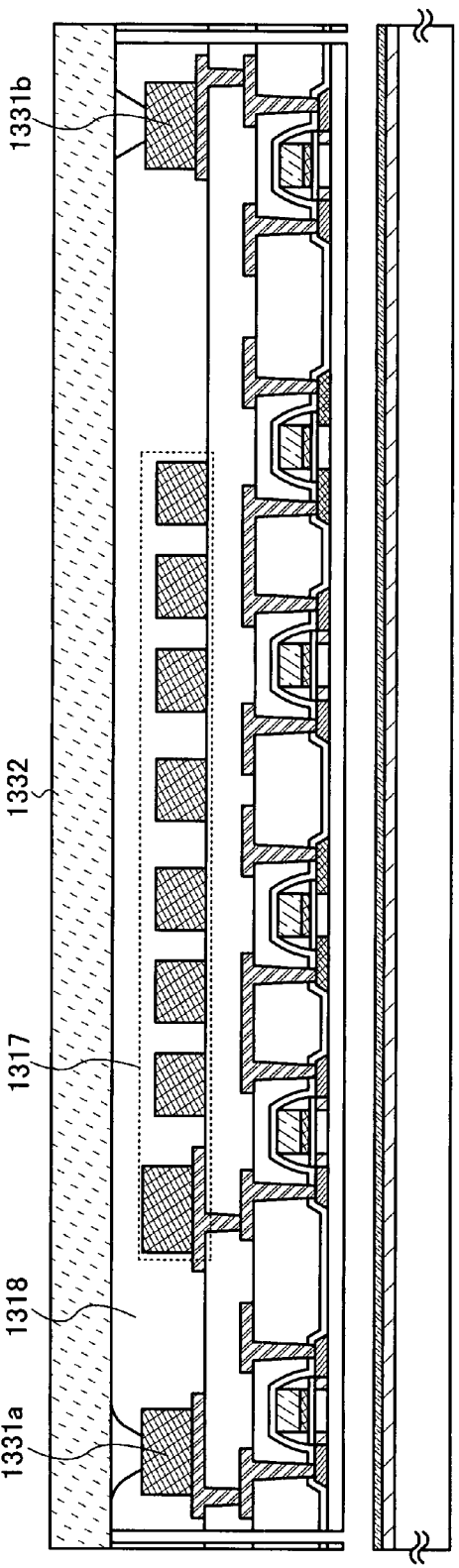
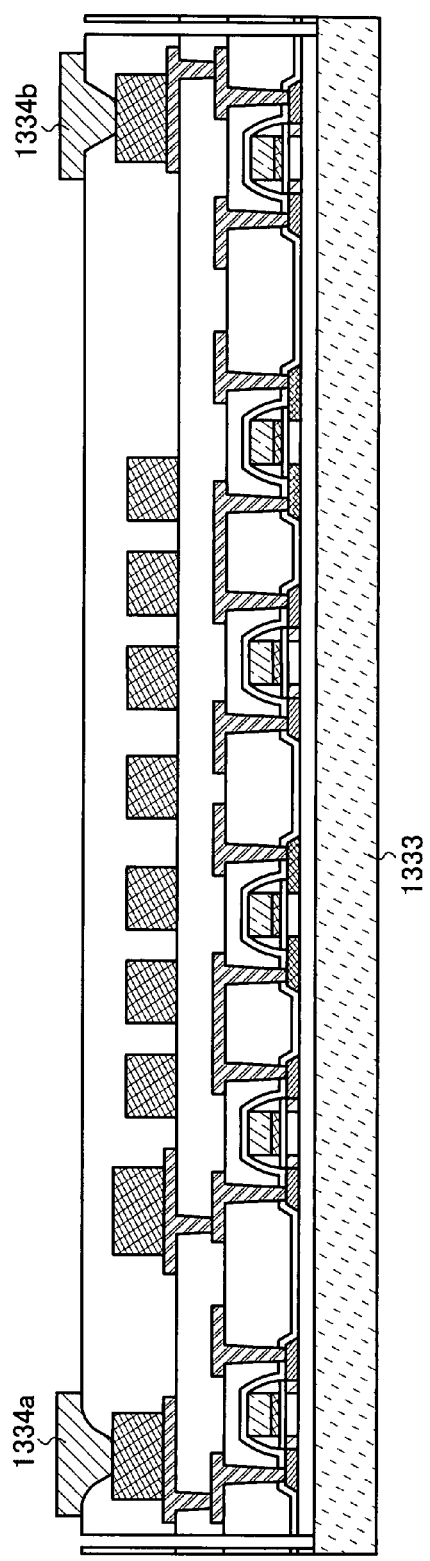
FIG. 21A
FIG. 21B

SEMICONDUCTOR DEVICE, COMMUNICATION SYSTEM, AND METHOD OF CHARGING THE SEMICONDUCTOR DEVICE

BACKGROUND OF THE INVENTION

1. Field of the Invention

The present invention relates to a semiconductor device including a battery that can be wirelessly charged.

2. Description of the Related Art

In recent years, various electric appliances come into wide use, and a wide variety of products are put on the market. In particular, the spread of portable wireless communication devices is notable. A power supply for driving a portable wireless communication device has a built-in battery which is chargeable and power is supplied from the battery into the portable wireless communication device. As the battery, a secondary cell such as a lithium ion battery or the like is generally used. As matters now stand, the battery is charged from an AC adaptor which is plugged into a household alternating current power supply.

Further, in recent years, an individual identification technology which employs wireless communication which uses an electromagnetic field, radio waves, or the like has attracted attention as one mode of usage of wireless communication devices. In particular, an individual identification technology which employs an RFID (radio frequency identification) tag that communicates data wirelessly has attracted attention. An RFID tag is also referred to as an IC (integrated circuit) tag, an IC chip, an RF tag, a wireless tag, and an electronic tag. The individual identification technology which employs RFID tags is beginning to be made use of in production, management, and the like of individual objects, and it is expected that this technology will also be applied to personal authentication, through inclusion in cards or the like.

In addition, development is advanced recently for a contactless charging device in which a battery is charged with using a combination of a primary coil provided to a power feeder for charging the battery, and a secondary coil provided to a device including the battery (e.g., Patent Document 1: Japanese Published Patent Application No. H10-14126).

SUMMARY OF THE INVENTION

However, in the case of charging the battery by arranging the primary coil of the power feeder and the secondary coil of the device including the battery close to each other, the power feeder and the device including the battery need to be put close to each other. Accordingly, in the case where there are a plurality of semiconductor devices provided with batteries, the power feeder needs to be put close to each of the plurality of semiconductor devices in order to charge their batteries. Further, when a semiconductor device including a battery that can be wirelessly charged is used for product management or the like, places of the power feeder and the semiconductor device need due consideration.

In accordance with the foregoing problems, it is an object of the present invention to provide a semiconductor device including a battery that can be wirelessly charged in a simple manner. In addition, it is another object of the present invention to provide a semiconductor device including a battery that can be wirelessly charged, even when a power feeder is not put close to the semiconductor device including the battery which can be wirelessly charged.

A semiconductor device of the present invention includes a battery that can be wirelessly charged, in which the battery can be charged using an electromagnetic wave transmitted from another semiconductor device. In addition, the semiconductor device of the present invention has a structure which transmits an electromagnetic wave to another semiconductor device so as to charge a battery therein. In other words, the semiconductor device of the present invention has a function of feeding or receiving electric power to or from another semiconductor device, as well as a function of charging using an electromagnetic wave transmitted from a power feeder. In addition, the semiconductor device of the present invention can have a structure in which the semiconductor device communicates with another semiconductor device to transmit and receive information. Details of a structure of the present invention are hereinafter described.

A semiconductor device of the present invention includes an antenna circuit, a communication control circuit to conduct wireless communication externally via the antenna circuit, a battery to be charged with electric power which is externally wirelessly fed via the antenna circuit, and an oscillator circuit to wirelessly feed electric power via the antenna circuit. In other words, a semiconductor device of the present invention has a structure in which the battery in the semiconductor device is wirelessly charged and the semiconductor device externally feeds electric power to a battery in another semiconductor device which can be charged¥ wirelessly.

Another semiconductor device of the present invention includes an antenna circuit; a communication control circuit to conduct wireless communication externally via the antenna circuit; a battery to be charged with electric power externally fed via the antenna circuit; a comparison arithmetic circuit to compare a state of charge of the battery and a state of charge of another battery in another semiconductor device, which is obtained by external communication; and an oscillator circuit which is capable of wirelessly feeding electric power to the another battery. A state of charge of the battery in the semiconductor device and that of the another battery in the another semiconductor device are compared and power can be fed from the semiconductor device with larger amount of charge to the semiconductor device with smaller amount of charge.

Another semiconductor device of the present invention includes an antenna circuit; a communication control circuit to conduct wireless communication externally via the antenna circuit; a battery to be charged with electric power externally fed via the antenna circuit; a data converter circuit to convert a state of charge of the battery into a digital value; a comparison arithmetic circuit to compare the state of charge of the battery, which is converted into the digital value by the data converter circuit, and a state of charge of another battery in another semiconductor device, which is obtained by external communication; and an oscillator circuit which is capable of wirelessly feeding electric power to the another battery.

Another semiconductor device of the present invention includes a first antenna circuit; a second antenna circuit; a communication control circuit to conduct wireless communication externally via the first antenna circuit; a battery to be charged with electric power externally fed via the second antenna circuit; a comparison arithmetic circuit to compare a state of charge of the battery and a state of charge of another battery in another semiconductor circuit, which is obtained by external communication; and an oscillator circuit which is capable of wirelessly feeding electric power to the another battery via the second antenna circuit.

Another semiconductor device of the present invention includes a first antenna circuit; a second antenna circuit; a communication control circuit to conduct wireless communication externally via the first antenna circuit; a battery to be charged with electric power externally fed via the second antenna circuit; a data converter circuit to convert a state of charge of the battery into a digital value; a comparison arithmetic circuit to compare the state of charge of the battery, which is converted into the digital value by the data converter circuit, and a state of charge of another battery in another semiconductor circuit, which is obtained by external communication; and an oscillator circuit which is capable of wirelessly feeding electric power to the another battery via the second antenna circuit.

In a semiconductor device of the present invention having any of the foregoing structures, the shape of a first antenna provided in the first antenna circuit and the shape of a second antenna provided in the second antenna circuit can be different from each other. For example, one of the first antenna and the second antenna may have a coil-shape.

In semiconductor devices each including a battery that can be wirelessly charged, a structure in which electric power of the batteries is fed and received between the semiconductor devices is realized, and therefore, a power feeder is not necessarily put close to each of the plurality of semiconductor devices for charging. As a result, a semiconductor device including a battery that can be wirelessly charged in a simple manner can be provided.

BRIEF DESCRIPTION OF THE DRAWINGS

FIGS. 15A to 15C illustrate an example of a method of manufacturing a semiconductor device of the present invention;

FIGS. 21A and 21B illustrate an example of a method of manufacturing a semiconductor device of the present invention;

DETAILED DESCRIPTION OF THE INVENTION

Figure 1:
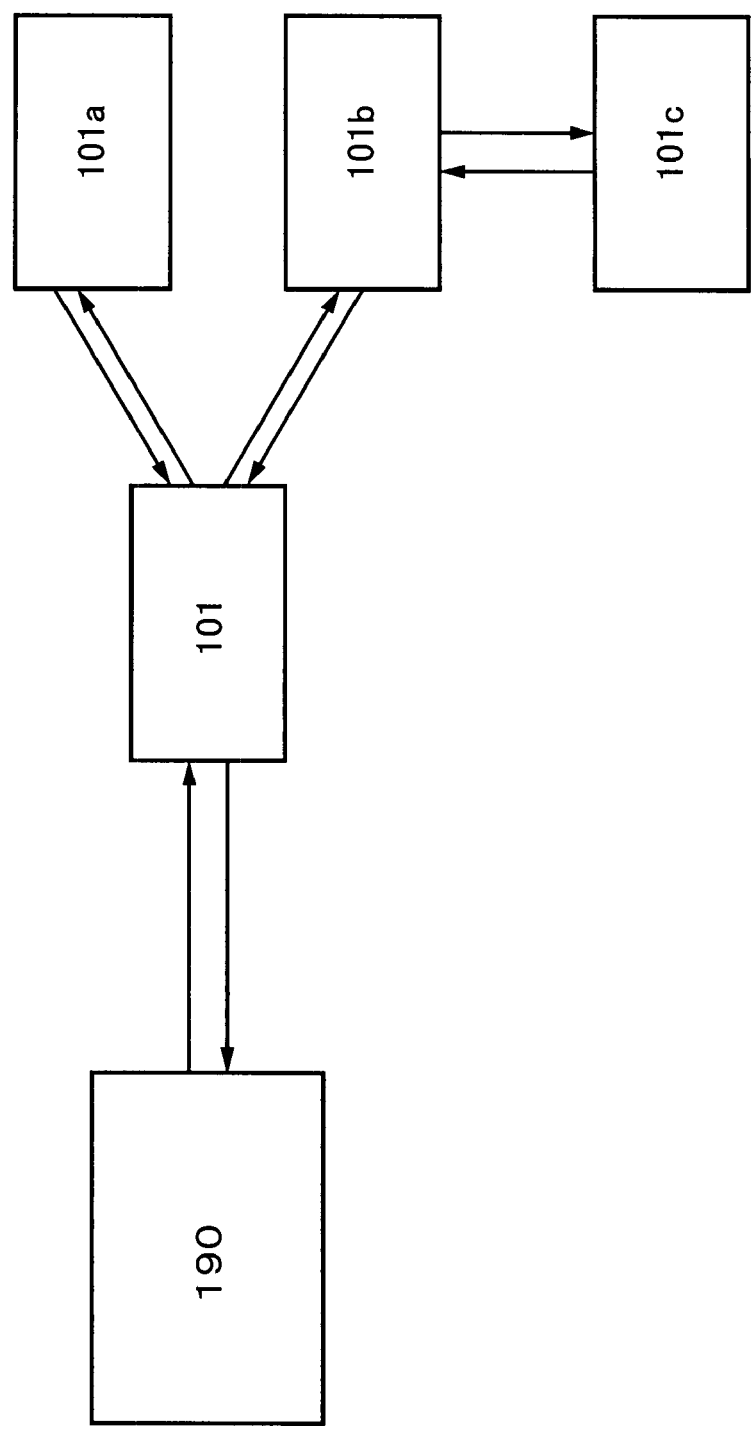
FIG. 1 illustrates communication or feeding and receiving of electric power between semiconductor devices of the present invention.

Hereinafter, embodiment modes of the present invention are described with reference to the drawings. The present invention can be carried out in many different modes, and it is easily understood by those skilled in the art that modes and details can be modified in various ways without departing from the purpose and the scope of the present invention. Accordingly, the present invention should not be interpreted as being limited to the description of the embodiment modes to be given below. Note that like portions in the drawings for describing embodiment modes are denoted by the like reference numerals and repeated explanations thereof are omitted.

Embodiment Mode 1

A semiconductor device of the present invention includes a battery that can be wirelessly charged, and has a structure in which the semiconductor device feeds or receives electric power of the battery to or from another semiconductor device. In other words, as shown in FIG. 1, a semiconductor device of the present invention not only receives an electromagnetic wave from a reader/writer 190 serving as a power feeder to charge a battery included in the semiconductor device, but also can communicate with another semiconductor device 101a or 101b having a similar structure in order to feed or receive electric power. In addition, the semiconductor device 101b can also communicate with another semiconductor device 101c which is within a predetermined area in order to feed or receive electric power.

Specific structures of a semiconductor device of the present invention are described hereinafter with reference to drawings.

Figure 2:
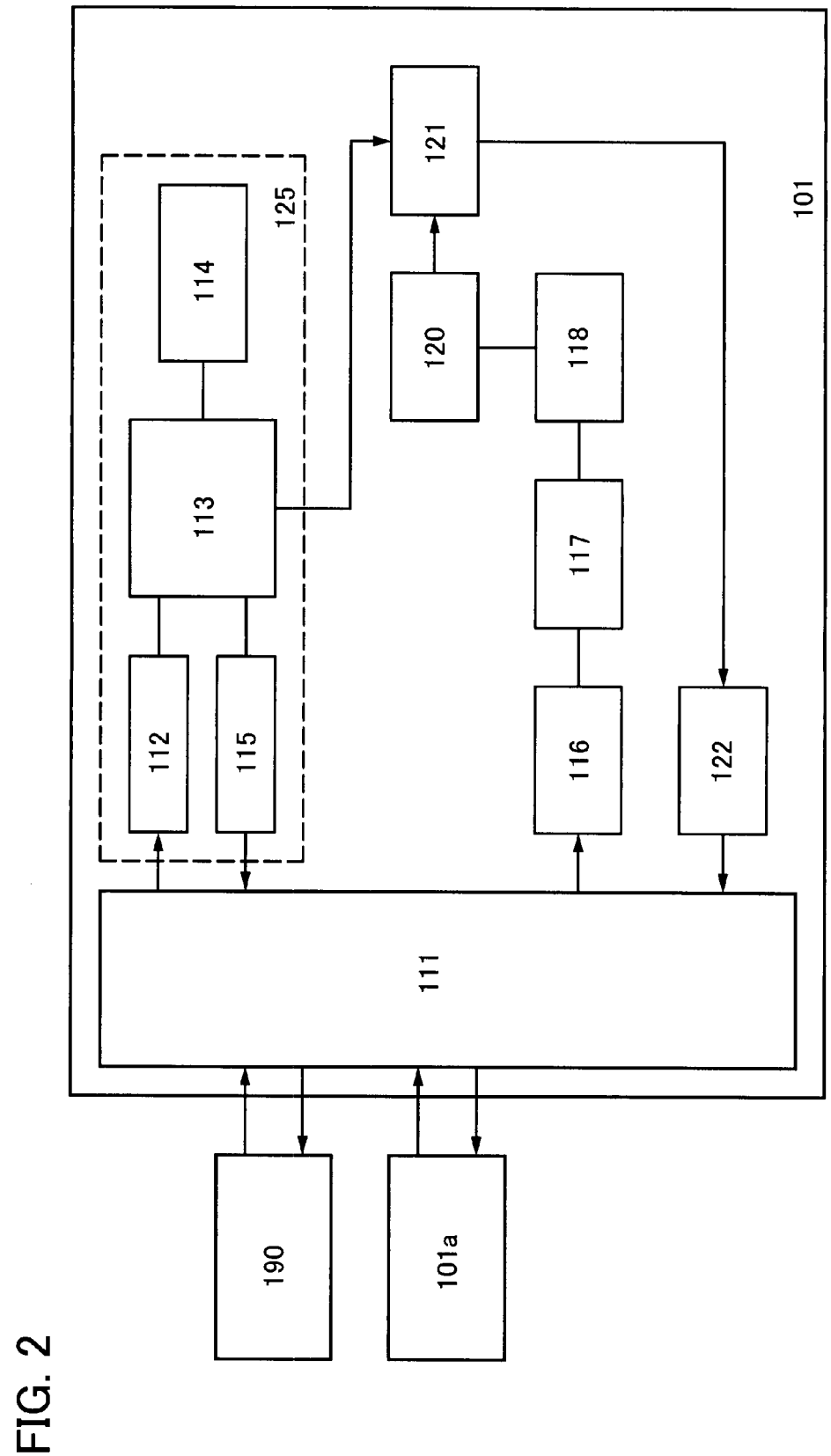
FIG. 2 illustrates an example of a semiconductor device of the present invention.

The semiconductor device 101 described in this embodiment mode includes an antenna circuit 111, a communication control circuit 125, a battery 118, a data converter circuit 120, a comparison arithmetic circuit 121, and an oscillator circuit 122 (see FIG. 2). The semiconductor device 101 wirelessly communicates with and feeds or receives electric power to or from an external reader/writer or another semiconductor device.

Figure 4A:
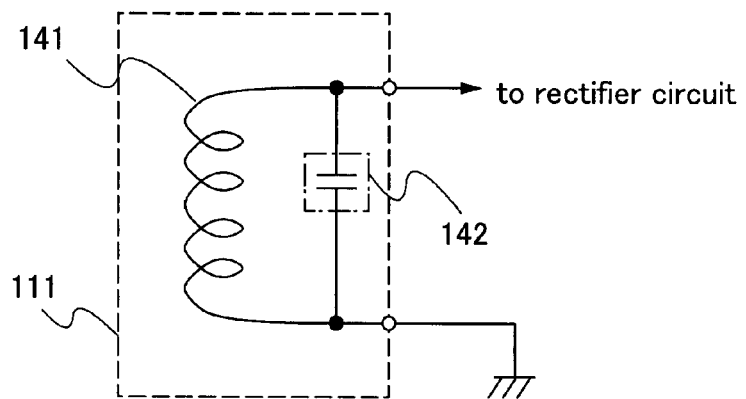
FIGS. 4A and 4B illustrate an example of antenna circuit and an example of a rectifier circuit, respectively.

The antenna circuit 111 may have a function of transmitting and receiving a communication signal (an electromagnetic wave); for example, an antenna 141 and a resonant capacitor 142 can form the antenna circuit 111 as shown in FIG. 4A. Here, the antenna 141 and the resonant capacitor 142 are collectively referred to as the antenna circuit 111. The shape of the antenna 141 may be decided in accordance with an electromagnetic wave used for communication. For example, in the case of using an electromagnetic induction method, a coil can be used; in the case of using an electric field method, a structure provided with a dipole antenna can be employed.

The communication control circuit 125 has a function of controlling wireless external communication via the antenna circuit 111 and transmits and receives information to and from the reader/writer or another semiconductor device. For example, the communication control circuit 125 transmits information on the semiconductor device 101 in response to a signal from the reader/writer, then, an electromagnetic wave is transmitted from the reader/writer based on the information in order to charge the battery 118. In addition, the communication control circuit 125 transmits and receives information on a state of charge of a battery provided in another semiconductor device to and from the another semiconductor device; based on the result thereof, electric power is fed or received and information is transmitted and received between the semiconductor devices.

In addition, the communication control circuit 125 includes a demodulation circuit 112, a logic circuit 113, a memory circuit 114, a modulation circuit 115, and the like. The demodulation circuit 112 has a function of extracting reception data from the communication signal; for example, the demodulation circuit 112 may be a low pass filter (LPF). The logic circuit 113, for example, determines whether to carry out writing to the memory circuit 114 or not depending on the data stored in the memory circuit 114, and controls another circuit. The memory circuit 114 stores information for individual identification and another piece of information. A nonvolatile memory may be the memory circuit 114, for example. The modulation circuit 115 has a function of superimposing transmission data on the communication signal.

In addition, the communication control circuit 125 can be driven with electric power which is fed from the battery 118. Further, a structure may be employed in which a power supply circuit which generates power source voltage from the communication signal is provided in the communication control circuit 125 and the communication control circuit 125 is driven by electric power from the power supply circuit.

The battery 118 has a function of being charged with electric power which is externally fed. Here, the communication signal is received by the antenna circuit 111, and then, the electric power can be fed to the battery 118 via a rectifier circuit 116 and a charge control circuit 117.

Figure 4B:
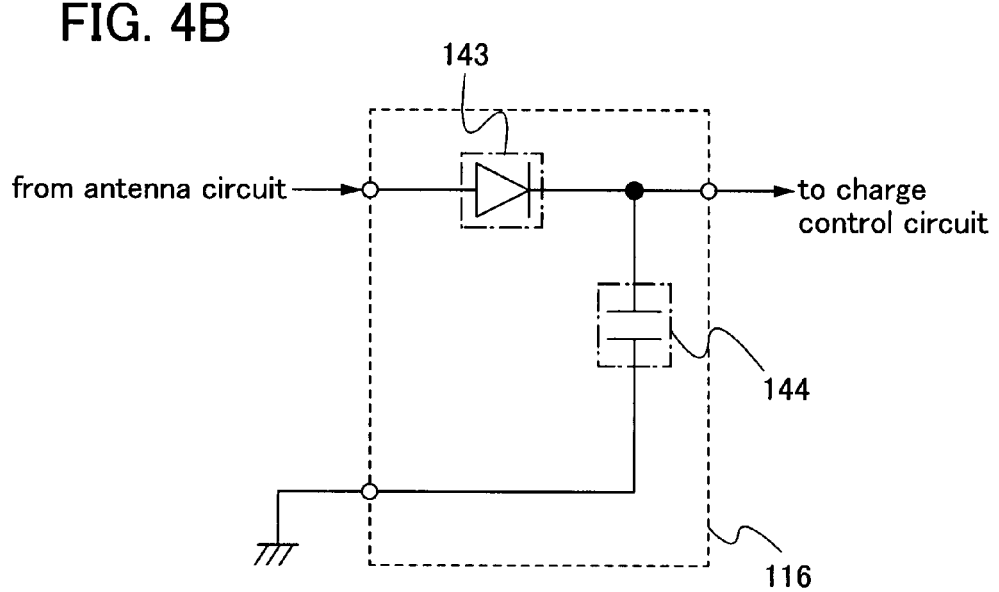

The rectifier circuit 116 may be any circuit which converts an AC signal, which has been induced by an electromagnetic wave received by the antenna circuit 111, into a DC signal. The rectifier circuit 116 mainly includes a diode and a smoothing capacitor. The rectifier circuit 116 may also include a resistor or a capacitor in order to adjust impedance. For example, as shown in FIG. 4B, the rectifier circuit 116 may include a diode 143, and a smoothing capacitor 144.

Figure 5A:
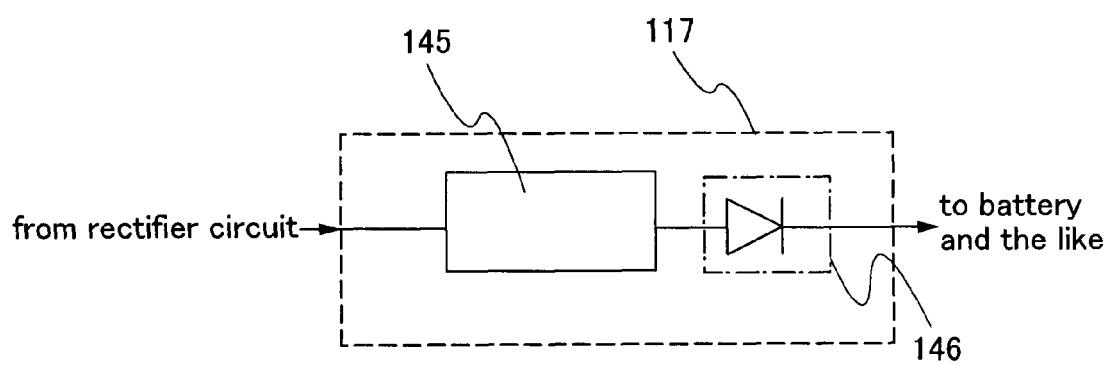
FIGS. 5A and 5B each illustrate an example of a charge control circuit of a semiconductor device of the present invention.
Figure 5B:
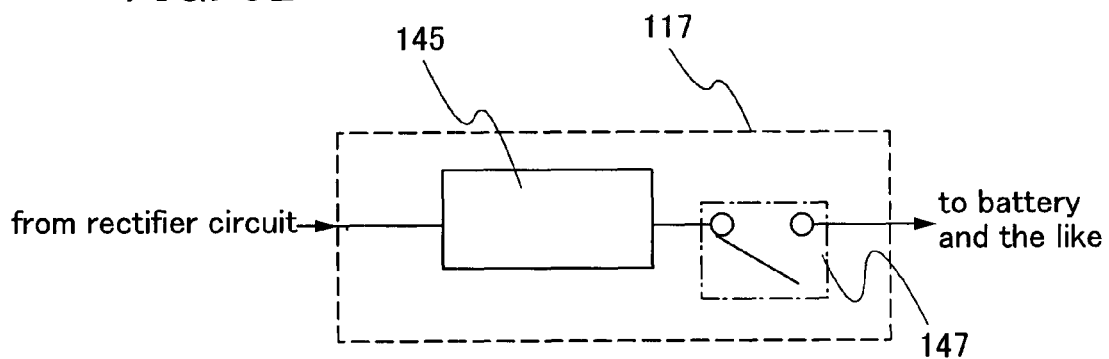

The charge control circuit 117 may be any circuit which controls a voltage level of an electric signal inputted from the rectifier circuit 116 and outputs the electric signal to the battery 118. For example, the charge control circuit 117 can include a regulator 145 which is a circuit which controls voltage, and a diode 146 which has rectifying characteristics, as shown in FIG. 5A. The diode 146 prevents leakage of electric power which the battery 118 charges. Therefore, a structure in which the diode 146 is replaced with a switch 147 may be employed, as shown in FIG. 5B. In the case of providing the switch 147, leakage of electric power in the battery 118 can be prevented by turning the switch on when the battery 118 is being charged and off when the battery 118 is not being charged.

In the present invention, 'battery' refers to power storage means of which electric power can be restored by being charged. Note that as power storage means, there are a secondary cell, a capacitor, and the like; however, in this specification, these power storage means are referred to under the general term 'battery'. As a battery, although the type of battery may differ depending on an intended use, a battery formed with a sheet-like shape is preferably used. For example, when a lithium battery, preferably a lithium polymer battery that uses a gel electrolyte, a lithium ion battery, or the like, miniaturization is possible. Needless to say, any battery may be used as long as it is chargeable. A battery that can be charged and discharged, such as a nickel metal hydride battery, a nickel cadmium battery, an organic radical battery, a lead-acid battery, an air secondary battery, a nickel-zinc battery, or a silver-zinc battery may be used. A high-capacity capacitor or the like may also be used.

Note that as a high-capacity capacitor which can be used as a battery in the present invention, a capacitor having electrodes whose opposing areas are large is preferable. It is preferable to use a double-layer electrolytic capacitor which employs an electrode material having a large specific surface area such as activated carbon, fullerene, or a carbon nanotube. Further, a capacitor can be easily formed to be thin and formed by stacking layers. A double-layer electrolytic capacitor is preferable because it has a function of storing power and will not deteriorate much even after being charged and discharged a number of times. In addition, the double-layer electrolytic capacitor can be charged quickly.

Note that in this embodiment mode, electric power that is stored in the battery is not limited to an electromagnetic wave received by the antenna circuit 111. A structure may be employed in which a power generation element is supplementarily provided in a part of the semiconductor device. Employing a structure in which a power generation element is provided in the semiconductor device is preferable because when such a structure is employed, the amount of electric power fed to be stored in the battery 118 can be increased and the charging rate can be increased. A power generation element may be, for example, a power generation element which employs a solar cell, a power generation element which employs a piezoelectric element, or a power generation element which employs a micro electro mechanical system (MEMS).

Figure 6A:
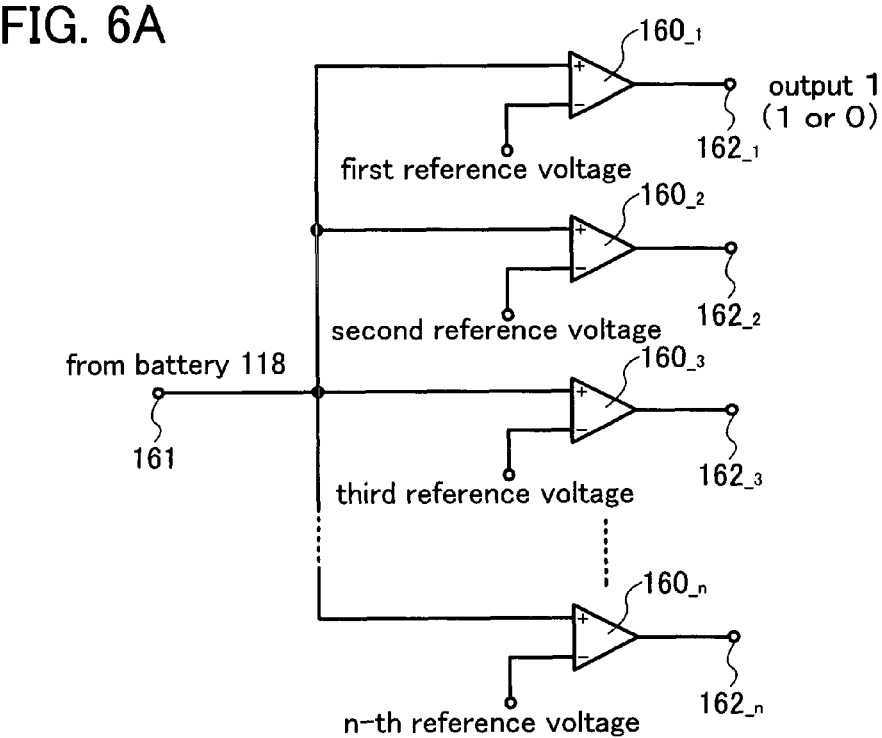
FIGS. 6A and 6B each illustrate an example of a data converter circuit of a semiconductor device of the present invention.

The data converter circuit 120 has a function of converting a state of charge (the amount of charge remaining) in the battery 118 from an analog value into a digital value. For example, the capacity of battery 118 may be rated on a scale of n-th stages and the data converter circuit 120 detects which stage the amount of charge remaining in the battery is in. One example of the data converter circuit 120 is shown in FIG. 6A. Here, the case is described in which the amount of charge remaining in the battery 118 is detected using the scale of level 1-to-n.

The data converter circuit 120 includes an input terminal 161, first to n-th comparators $160\_1$ to $160\_n$, and first to n-th output terminals $162\_1$ to $162\_n$. The input terminal 161 is electrically connected to the battery 118 and voltage of the battery 118 is inputted thereto.

Each of the first to n-th comparators $160_{\_1}$ to $160_{\_n}$ may be any circuit which compares values of two inputted signals and outputs the result of the comparison. Here, each of the comparators has two input portions and one output portion. In the first comparator $160_{\_1}$, a signal (the voltage of the battery 118) is inputted to one of the input portions from the input terminal 161 and a first reference voltage is inputted to the other input portion. The first comparator $160_{\_1}$ then compares the values of the two inputted voltages and outputs the result to the first output terminal $162_{\_1}$. Similarly, in each of the second to n-th comparators $160_{\_2}$ to $160_{\_n}$, a signal is inputted to one of the input portions from the input terminal 161 and the corresponding one of second to n-th reference voltages is inputted to the other input portion, and the comparison result of the two inputted signals is outputted to one of the output terminals $162_{\_2}$ to $162_{\_n}$.

In the data converter circuit 120, the first to n-th reference voltages range from smallest to largest in that order (the first reference voltage > the second reference voltage > the third reference voltage > . . . > the n-th reference voltage); therefore, the level to which the amount of charge remaining in the battery 118 corresponds to can be detected.

For example, in the case of using a battery which can charge up to 5V as the battery 118, the first to fourth comparators $160_{\_1}$ to $160_{\_4}$ are provided (the case where n=4 in FIG. 6A), and the first reference voltage is 1 V, the second reference voltage is 2 V, the third reference voltage is 3 V, and the fourth reference voltage is 4 V. Then, the voltage inputted from the battery 118 and is compared with each of the reference voltages and the level of the amount of charge remaining in the battery 118 is determined according to the comparison result. For example, a voltage of larger than or equal to 0 V (which is a state in which the battery is not charged at all) and smaller than 1 V can be Level 1, a voltage of larger than or equal to 1 V and smaller than 2 V can be Level 2, a voltage of larger than or equal to 2 V and smaller than 3 V can be Level 3, a voltage of larger than or equal to 3 V and smaller than 4 V can be Level 4, and a voltage of larger than or equal to 4 V and smaller than or equal to 5 V (which is a state in which the battery is fully charged) can be Level 5.

In this manner, by using data converter circuit 120, the amount of charge remaining in the battery 118 can be converted into a digital value.

Note that the structure of the data converter circuit 120 is not limited to the one shown in FIG. 6A. For example, the one shown in FIG. 6B may be employed.

Figure 6B:
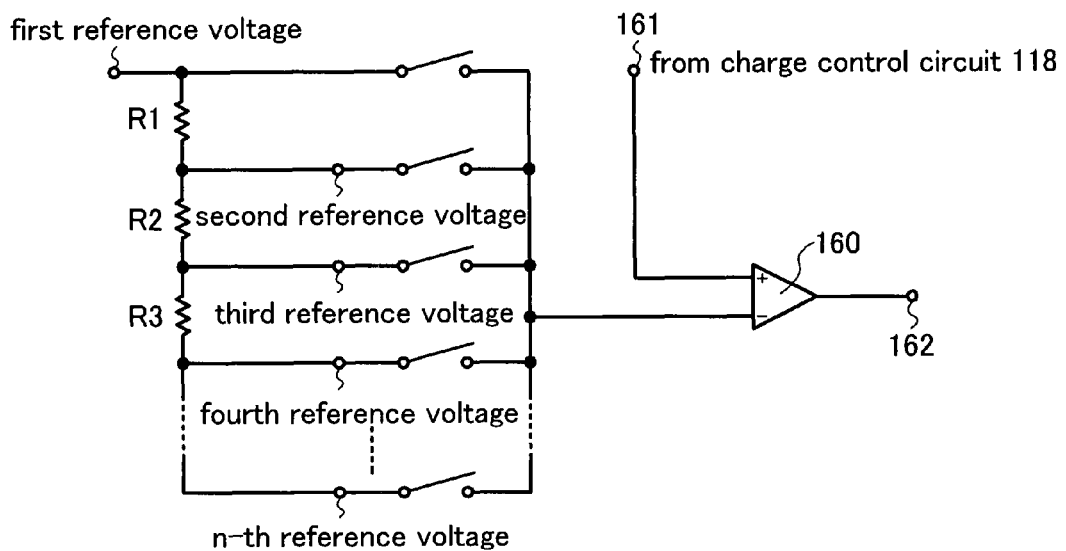

The data converter circuit 120 shown in FIG. 6B includes the input terminal 161, the comparator 160, and the output terminal 162. The input terminal 161 is electrically connected to the battery 118 and the voltage of the battery 118 is inputted thereto.

In this case, a signal is inputted to one of the input portions in the comparator from the input terminal 161 and the first to n-th reference voltages are sequentially inputted to the other input portion. The comparator compares signals inputted to the one input terminal and the other input terminal and outputs the result to the output terminal 162. For example, when the voltage of the battery 118 is larger or equal to an m-th reference voltage and smaller than or equal to an (m+1)-th reference voltage, (Vi+1), the results corresponding to the inputs of the first to m-th reference voltages (for example, the output is "1") are different from the results corresponding to the inputs of the (m+1)-th to n-th reference voltages (for example, the output is "0"). Therefore, the level of the state of charge in the battery 118 can be detected.

Note that in the case of comparing the amount of charge remaining in the batteries in analog values, a structure in which the data converter circuit 120 is not provided in the semiconductor device 101 may be provided.

The comparison arithmetic circuit 121 has a function of comparing the state of the battery 118, which is converted by the data converter circuit 120, and a state of a battery in another semiconductor device, which is received via the communication control circuit 125. As a result of the comparison in the comparison arithmetic circuit 121, when the amount of charge remaining in the battery 118 provided in the semiconductor device 101 is larger than that in the battery in the other semiconductor device, electric power is fed from the oscillator circuit 122 to the other semiconductor device via the antenna circuit 111.

The oscillator circuit 122 has a function of feeding electric power by transmitting an electromagnetic wave to the other semiconductor device, when there is an instruction from the comparison arithmetic circuit 121. The oscillator circuit 122 may be any circuit which can transmit an electromagnetic wave via the antenna circuit 111.

Thus, by employing a structure in which electric power of the batteries is fed and received between the semiconductor devices, the necessity to place a power feeder close to each of the plurality of semiconductor devices to conduct charging is eliminated. In addition, because a structure in which communication is performed between the semiconductor devices is employed, it is not necessary to place a reader/writer close to each of the plurality of semiconductor devices to read information, and as a result, the communication distance can be increased.

Note that a structure of a semiconductor device in this embodiment mode can be implemented by being combined with a structure of a semiconductor device in another embodiment mode described in this specification.

Embodiment Mode 2

In this embodiment mode, a semiconductor device which is different from that described in the foregoing embodiment mode is described with reference to the drawings.

A semiconductor device in this embodiment mode has a structure in which a plurality of antenna circuits are provided. The case of providing two antenna circuits, a first antenna circuit 151 and a second antenna circuit 152, is described hereinafter.

Figure 3:
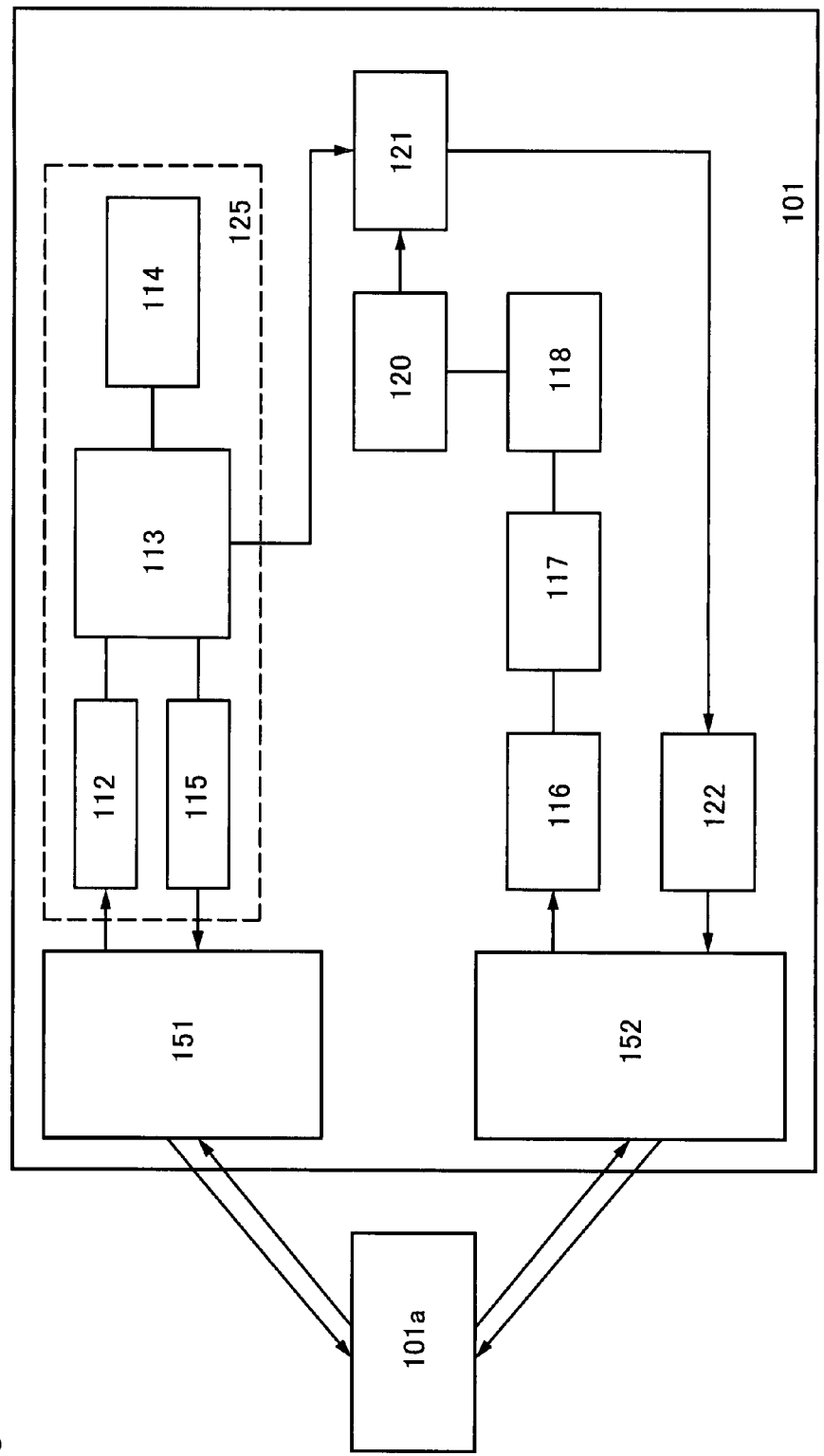
FIG. 3 illustrates an example of a semiconductor device of the present invention.

The semiconductor device 101 described in this embodiment mode includes the first antenna circuit 151, the second antenna circuit 152, the communication control circuit 125, the battery 118, the data converter circuit 120, the comparison arithmetic circuit 121, and the oscillator circuit 122 (see FIG. 3). Each of the first antenna circuit 151 and the second antenna circuit 152 may have a structure having a function of transmitting and receiving a communication signal (an electromagnetic wave); for example, the antenna 141 and the resonant capacitor 142 can form the antenna circuit, as shown in FIG. 4A.

The communication control circuit 125 wirelessly communicates with a reader/writer and another semiconductor device via the first antenna circuit 151. In addition, a structure can be employed in which charging of electric power to the battery 118 and transmission of an electromagnetic wave to the other semiconductor device from the oscillator circuit 122 are performed via the second antenna circuit 152.

The shapes of the first antenna circuit 151 and the second antenna circuit 152 may be decided taking an electromagnetic wave which is used for communication into consideration. For example, in the case of using an electromagnetic induction method, a coil can be used, and in the case of using an electric field method, a structure provided with a dipole antenna can be employed. Further, the first antenna circuit 151 and the second antenna circuit 152 may have shapes such that they receive the same wave length or receive different wave lengths. For example, one of the first antenna circuit 151 and the second antenna circuit 152 may be a dipole antenna and the other one may be a coil.

Figure 7A:
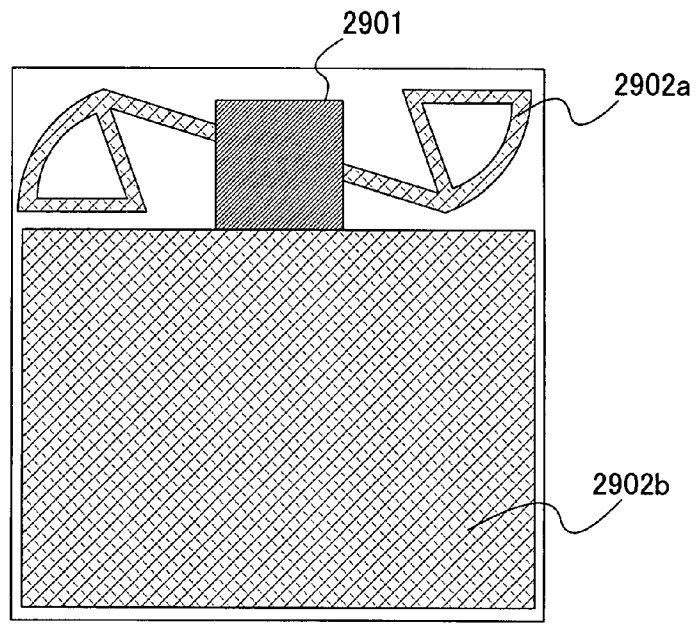
FIGS. 7A and 7B each illustrate an example of a semiconductor device of the present invention.

For example, as shown in FIG. 7A, a 180 degrees omnidirectional (can receive signals equally from any direction) antenna 2902a which is provided as an antenna in the first antenna circuit 151 and a sheet antenna 2902b which is provided as an antenna in second antenna circuit 152 can be provided around a chip 2901 provided with the communication control circuit 125, the battery 118, the oscillator circuit 122, and the like. Needless to say, alternatively the antenna 2902b may be provided as the antenna in the first antenna circuit 151 and the antenna 2902a may be provided as the antenna in the second antenna circuit 152.

Figure 7B:
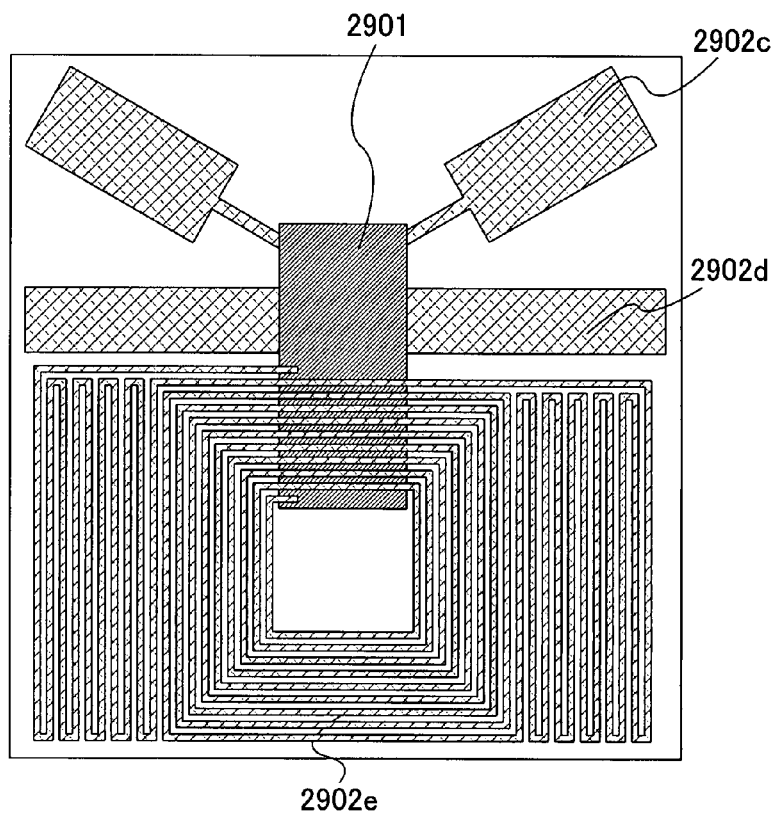

Alternatively, a structure may be employed in which the second antenna circuit 152, which is used to charge electric power to the battery 118, includes two antennas. For example, as shown in FIG. 7B, an antenna 2902c for receiving a high frequency electromagnetic wave, which is an antenna in the first antenna circuit 151, and an antenna 2902d which extends in a long rod-shape and an antenna 2902e with a thin coiled shape, which are antennas in the second antenna circuit 152, can be provided around the chip 2901 provided with the communication control circuit 125, the battery 118, the oscillator circuit 122, and the like. Needless to say, the antennas 2902d and 2902e may be provided as the antennas in the first antenna circuit 151 and the antenna 2902c may be provided as the antenna in the second antenna circuit 152. When antennas having a plurality of shapes are thus provided, a semiconductor which can receive electromagnetic with different frequency bands (for example, an electromagnetic wave from a power feeder and electromagnetic waves generated at random outside) can be formed.

Note that although a structure in which two antenna circuits are provided is shown in FIG. 3, the structure is not limited thereto, and a structure in which three or more antenna circuits are provided may be employed. For example, as shown in FIG. 10, a structure in which three antenna circuits, the first to third antenna circuits 151 to 153, are provided may be employed.

Figure 10:
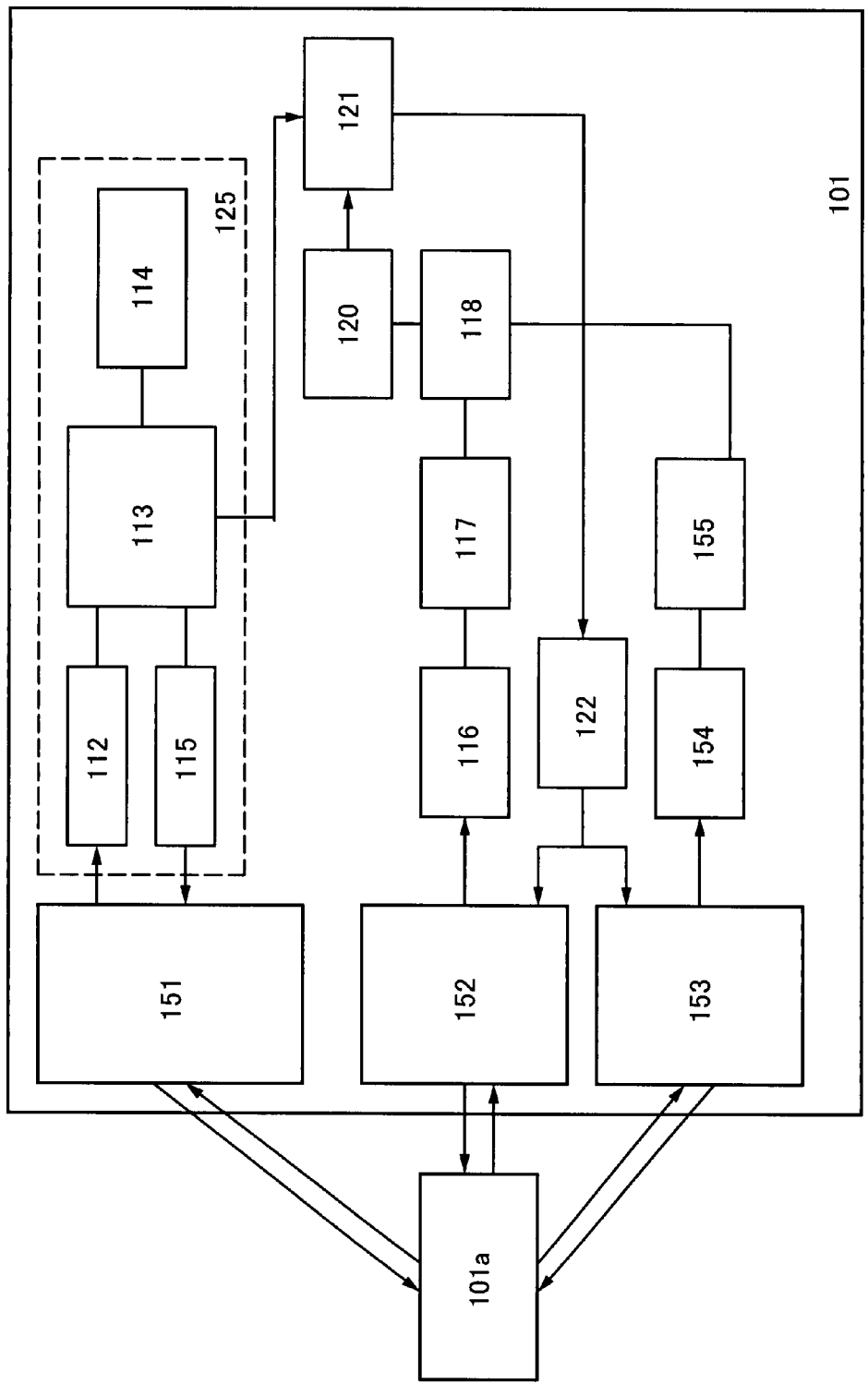
FIG. 10 illustrates an example of a semiconductor device of the present invention.

In FIG. 10, the communication control circuit 125 wirelessly communicates with the reader/writer and another semiconductor device via the first antenna circuit 151. In addition, a structure can be employed in which charging of electric power to the battery 118 and transmission of an electromagnetic wave to the other semiconductor device from the oscillator circuit 122 are performed via the second antenna circuit 152 or the third antenna circuit 153. A structure can be employed in which the battery 118 is charged using an electromagnetic wave received by the second antenna circuit 152 which is supplied to the battery 118 via the rectifier circuit 116 and the charge control circuit 117. Alternatively, a structure can be employed in which the battery 118 is charged using an electromagnetic wave received by the third antenna circuit 153 which is supplied to the battery 118 via a rectifier circuit 154 and the charge control circuit 155. Further, when a structure is employed in which the second antenna circuit 152 and the third antenna circuit 153 receive different wave lengths, a plurality of wave lengths can be used for charging the battery 118. For example, one of an antenna of the second antenna circuit 152 and an antenna of the third antenna circuit 153 can be a coil to which an electromagnetic induction method is applied and the other one can be a dipole antenna to which an electric field method is applied.

When a plurality of antenna circuits are thus provided, communication of the communication control circuit 125 and the charging of the battery 118 can be carried out using different frequencies.

Note that a structure of a semiconductor device in this embodiment mode can be implemented by being combined with a structure of a semiconductor device in another embodiment mode described in this specification.

Embodiment Mode 3

In this embodiment mode, the case in which a semiconductor device feeds or receives electric power to or from a reader/writer or another semiconductor device is described with reference to the drawings.

Figure 8:
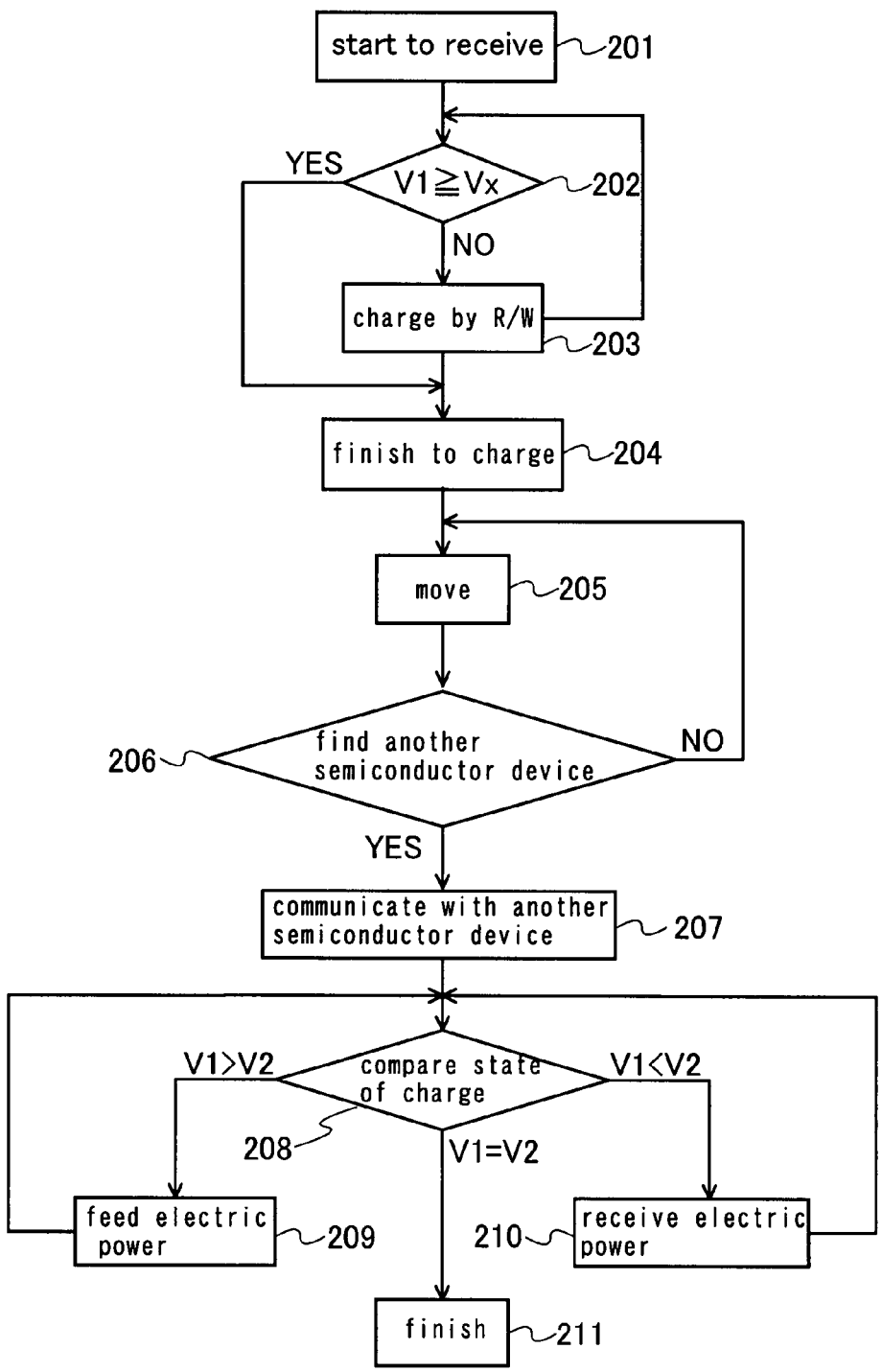
FIG. 8 illustrates an example of feeding and receiving electric power between semiconductor devices of the present invention.

First, the case is described in which a semiconductor device which receives electric power from a reader/writer feeds or receives electric power to or from another semiconductor device, with reference to FIG. 8.

When the semiconductor device comes into a communication range of the reader/writer, the semiconductor device starts to receive an electromagnetic wave which is transmitted from the reader/writer (201). Then, the reader/writer detects a state of charge of a battery in the semiconductor device. Here, the reader/writer detects whether the battery in the semiconductor device has a voltage equal to or larger than a predetermined voltage value (e.g., Vx) (202). If the voltage of the battery, V1, is smaller than Vx, the battery starts to be charged by receiving an electromagnetic wave transmitted from the reader/writer (203). When the voltage of the battery, V1, becomes equal to or larger than the predetermined voltage value (Vx), the battery stops being charged (204). Note that charging can be stopped by turning off a switch provided in the semiconductor device when the voltage of the battery equals or exceeds the predetermined voltage value. Alternatively, a structure can be employed in which when the voltage of the battery equals or exceeds the predetermined voltage value, a signal is transmitted from the semiconductor device to the reader/writer to stop the transmission of electromagnetic waves from the reader/writer.

Next, when the semiconductor device (hereinafter referred to as a first semiconductor device) moves (205) and finds another semiconductor device (hereinafter referred to as a second semiconductor device) (206), the first semiconductor device communicates with the found second semiconductor device and detects a state of charge of a battery in the second semiconductor device (and the second semiconductor device detects a state of charge of the battery in the first semiconductor device) (207). Note that although the case in which the first semiconductor device moves and finds the second semiconductor device is described as an example here, there is also a case in which the first semiconductor device finds the second semiconductor device without moving, and detects the state of charge of the second semiconductor device.

Next, in a comparison arithmetic circuit provided in the first semiconductor device, the voltage of the battery in the first semiconductor device, V1, and voltage of the battery in the found second semiconductor device, V2, are compared (208). If the comparison reveals that the voltage of the battery in the first semiconductor device, V1, is larger than the voltage of the battery in the second semiconductor device, V2, (i.e., V1>V2), an electromagnetic wave is transmitted from an oscillator circuit in the first semiconductor device, so that electric power is fed to the battery in the second semiconductor device (209). If the voltage of the battery in the first semiconductor device, V1, is smaller than the voltage of the battery in the second semiconductor device, V2, (i.e., V1<V2), the first semiconductor device receives electromagnetic wave which is transmitted from an oscillator circuit in the second semiconductor device, so that the battery in the first semiconductor device receives electric power (210). When the voltage of the battery in the first semiconductor device and that of the battery in the second semiconductor device become equal (i.e., V1=V2), feeding and receiving of electric power between the first semiconductor device and the second semiconductor device stop (211). Note that here, becoming equal includes becoming approximately equal.

Note that although FIG. 8 shows an example in which the first semiconductor device feeds or receives electric power to or from the second semiconductor device until the voltage of the battery in the first semiconductor device, V1, and the voltage of the battery in the second semiconductor device, V2, become approximately equal, the present invention is not limited thereto. For example, a structure may be employed in which even when the voltage of the battery in the first semiconductor device, V1, and the voltage of the battery in the second semiconductor device, V2, are different from each other; when V1 and V2 are each larger than or equal to a predetermined voltage (e.g., Vy), the first semiconductor device and the second semiconductor device do not feed or receive electric power to or from each other. This case is briefly described with reference to FIG. 9.

Figure 9:
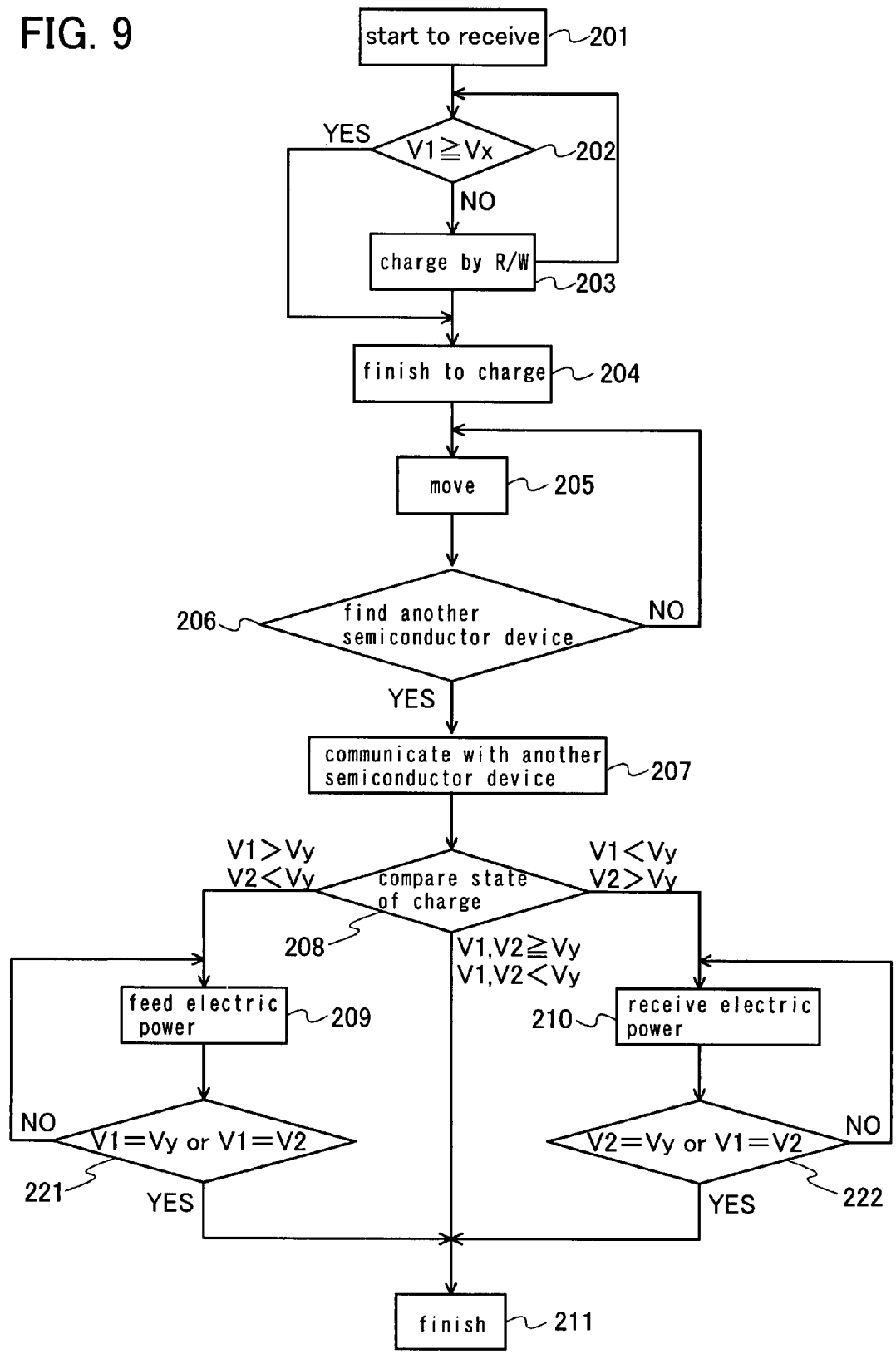
FIG. 9 illustrates an example of feeding and receiving electric power between semiconductor devices of the present invention.

In FIG. 9, the following steps can be carried out similarly to those in FIG. 8: the step (206) in which the first semiconductor device finds the second semiconductor device, the following step, (207), in which the first semiconductor device communicates with the second semiconductor device, and the step (208) in which the voltage of the battery in the first semiconductor device, V1, and the voltage of the battery in the found second semiconductor device, V2, are compared.

If the comparison of V1 and V2 reveals that V1 and V2 are each larger than or equal to the predetermined voltage Vy (i.e., V1≦Vy and V2≦Vy), or V1 and V2 are each smaller than the predetermined voltage Vy (i.e., V1<Vy and V2<Vy), the first semiconductor device and the second semiconductor device finish their communication without feeding and receiving electric power to or from each other (211). Thus, in the case where both of the batteries in the first and second semiconductor devices have enough electric power, or in the case where both of the batteries in the first and second semiconductor devices do not have enough electric power, the first semiconductor device and the second semiconductor device do not feed or receive electric power to or from each other; therefore, electric power in the batteries can be prevented from being wasted.

Further, if V1 is larger than the predetermined voltage Vy and V2 is smaller than the predetermined voltage Vy, (i.e., V1>Vy and V2<Vy), an electromagnetic wave is transmitted from the oscillator circuit in the first semiconductor device, so that electric power is fed to the battery in the second semiconductor device (209). The voltage of the battery in the first semiconductor device, V1 and the voltage of the battery in the second semiconductor device, V2 are compared (221). When the voltage of the battery in the first semiconductor device V1 is decreased and becomes equal to the level of the predetermined voltage Vy (i.e., V1=Vy), or the voltage of the battery in the first semiconductor device and that of the battery in the second semiconductor device become equal (i.e., V1=V2), feeding and receiving of electric power between the first semiconductor device and the second semiconductor device stop (211). Note that here, becoming equal includes becoming approximately equal. Thus, transmission of the electromagnetic wave is stopped when the voltage of the battery in the first semiconductor device becomes equal to the predetermined voltage, and therefore, a predetermined amount of electric power can be maintained in the first semiconductor device.

Further, if V1 is smaller than the predetermined voltage Vy and V2 is larger than the predetermined voltage Vy (i.e., V1<Vy and V2>Vy), the first semiconductor device receives an electromagnetic wave which is transmitted from the oscillator circuit in the second semiconductor device, so the battery in the first semiconductor device receives electric power (210). The voltage of the battery in the first semiconductor device, V1 and the voltage of the battery in the second semiconductor device, V2 are compared (222). When the voltage of the battery in the second semiconductor device V2 is decreased and becomes equal to the level of the predetermined voltage Vy (i.e., V2=Vy), or the voltage of the battery in the first semiconductor device and that of the battery in the second semiconductor device become equal (i.e., V1=V2), feeding and receiving of electric power between the first semiconductor device and the second semiconductor device stop (211). Note that here, becoming equal includes becoming approximately equal. Thus, transmission of the electromagnetic wave is stopped when the voltage of the battery in the second semiconductor device becomes equal to the predetermined voltage, and therefore, a predetermined amount of electric power can be maintained in the second semiconductor device.

Note that in the foregoing description, when the first semiconductor device finds a plurality of the semiconductor devices, the first semiconductor device may preferentially feed or receive electric power to or from a semiconductor device whose battery has the lowest voltage of the batteries of those semiconductor devices.

Note that a structure of a semiconductor device in this embodiment mode can be implemented by being combined with a structure of a semiconductor device in another embodiment mode described in this specification.

Embodiment Mode 4

In this embodiment mode, an example of a method of manufacturing a semiconductor device described in any of the foregoing embodiment modes is described with reference to the drawings. In this embodiment mode, a structure in which a communication control circuit, a rectifier circuit, a charge control circuit, and the like of a semiconductor device are formed over one substrate using thin film transistors is described. Note that it is preferable to form a communication control circuit, a rectifier circuit, a charge control circuit, and the like over one substrate at one time, because this can lead to reduction in size. In addition, an example in which a thin-film secondary battery is used as a battery is described. Needless to say, a double-layer electrolytic capacitor or the like may be provided instead of a secondary battery.

Figure 18A:
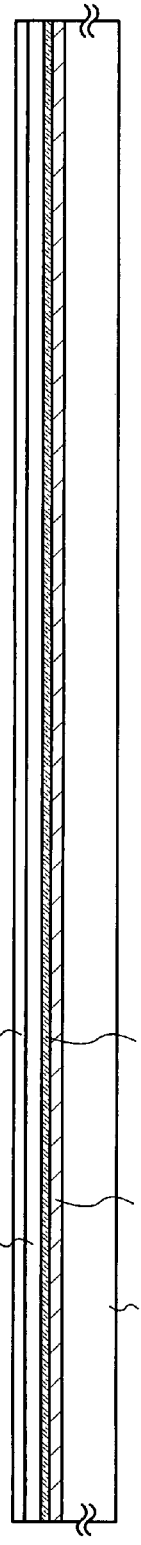
FIGS. 18A to 18D illustrate an example of a method of manufacturing a semiconductor device of the present invention.

First, a peeling layer 1303 is formed over one surface of a substrate 1301 with an insulating film 1302 therebetween, and then an insulating film 1304 serving as a base film and a semiconductor film (e.g., an amorphous semiconductor film 1305) are stacked thereover (see FIG. 18A). Note that the insulating film 1302, the peeling layer 1303, the insulating film 1304, and the amorphous semiconductor film 1305 can be formed consecutively.

The substrate 1301 is selected from a glass substrate, a quartz substrate, a metal substrate (e.g., a stainless steel substrate), a ceramic substrate, a semiconductor substrate such as a Si substrate, a silicon insulator (SOI) substrate, and the like.

Alternatively, a plastic substrate made of polyethylene terephthalate (PET), polyethylene naphthalate (PEN), polyether sulfone (PES), acrylic, or the like can be used. In this process, although the peeling layer 1303 is provided over the entire surface of the substrate 1301 with the insulating film 1302 therebetween, the peeling layer 1303 can be selectively formed by a photolithography method after being provided over the entire surface of the substrate 1301.

The insulating films 1302 and 1304 are formed using insulating materials such as silicon oxide, silicon nitride, silicon oxynitride ($SiO_xN_y$, where x>y), or silicon nitride oxide ($SiN_xO_y$, where x>y) by a CVD method, a sputtering method, or the like. For example, when each of the insulating films 1302 and 1304 is formed to have a two-layer structure, a silicon nitride oxide film may be formed as a first insulating film and a silicon oxynitride film may be formed as a second insulating film. In addition, a silicon nitride film may be formed as the first insulating film and a silicon oxide film may be formed as the second insulating film. The insulating film 1302 serves as a blocking layer which prevents an impurity element contained in the substrate 1301 from getting mixed into the peeling layer 1303 or elements formed thereover. The insulating film 1304 serves as a blocking layer which prevents an impurity element contained in the substrate 1301 or the peeling layer 1303 from getting mixed into elements formed over the insulating film 1304. In this manner, providing the insulating films 1302 and 1304 which serve as the blocking layers can prevent adverse effects on the elements formed over the peeling layer 1303 or the insulating film 1304, which would otherwise be caused by an alkali metal such as Na or an alkaline earth metal contained in the substrate 1301 or by the impurity element contained in the peeling layer 1303. Note that when quartz is used for the substrate 1301, the insulating films 1302 and 1304 are not necessarily provided.

The peeling layer 1303 may be formed using, for example, a metal film or a stack-layer structure of a metal film and a metal oxide film. As a metal film, either a single layer or stack layer is formed using an element selected from tungsten (W), molybdenum (Mo), titanium (Ti), tantalum (Ta), niobium (Nb), nickel (Ni), cobalt (Co), zirconium (Zr), zinc (Zn), ruthenium (Ru), rhodium (Rh), palladium (Pd), osmium (Os), and iridium (Ir), or an alloy material or a compound material containing any of those elements as its main component. In addition, the metal film or the metal oxide film can be formed by a sputtering method, various CVD methods such as a plasma CVD method. A stack-layer structure of a metal film and a metal oxide film can be obtained by, after forming the above-described metal film, applying plasma treatment thereto under an oxygen atmosphere or an $N_2O$ atmosphere or applying heat treatment thereto under an oxygen atmosphere or an $N_2O$ atmosphere; whereby oxide or oxynitride of the metal film can be formed on the surface of the metal film. For example, when a tungsten film is provided as a metal film by a sputtering method, a CVD method, or the like, a metal oxide film of tungsten oxide can be formed on the surface of the tungsten film by application of plasma treatment to the tungsten film.

The amorphous semiconductor film 1305 is formed by a sputtering method, an LPCVD method, a plasma CVD method, or the like to have a thickness of 25 to 200 nm (preferably, 30 to 150 nm).

Figure 18B:
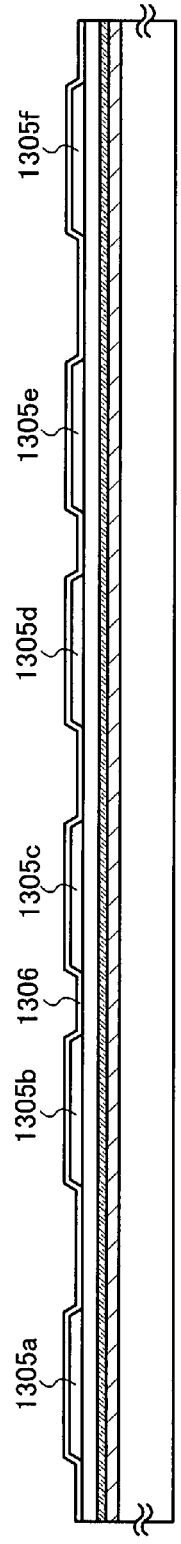

Then, the amorphous semiconductor film 1305 is crystallized by being irradiated with laser light. Alternatively, the amorphous semiconductor film 1305 may be crystallized by, for example, a method in which laser light irradiation is combined with a thermal crystallization method using an RTA or an annealing furnace, or with a thermal crystallization method using a metal element for promoting crystallization. After that, the obtained crystalline semiconductor film is etched to have desired shapes, so that crystalline semiconductor films 1305*a* to 1305*f* are formed. Then, a gate insulating film 1306 is formed so as to cover the semiconductor films 1305*a* to 1305*f* (see FIG. 18B).

The gate insulating film 1306 is formed of an insulating material such as silicon oxide, silicon nitride, silicon oxynitride, or silicon nitride oxide, by a CVD method, a sputtering method, or the like. For example, when the gate insulating film 1306 has a two-layer structure, a silicon oxynitride film may be formed as a first insulating film and a silicon nitride oxide film may be formed as a second insulating film. Alternatively, a silicon oxide film may be formed as the first insulating film and a silicon nitride film may be formed as the second insulating film.

An example of a formation process of the crystalline semiconductor films 1305*a* to 1305*f* is briefly described below. First, an amorphous semiconductor film is formed by a plasma CVD method to have a thickness of 50 to 60 nm. Then, a solution containing nickel, which is a metal element for promoting crystallization, is retained on the amorphous semiconductor film, and dehydrogenation treatment (at 500° C., for one hour) and thermal crystallization treatment (at 550° C., for four hours) are performed on the amorphous semiconductor film. Thus, a crystalline semiconductor film is formed. After that, the crystalline semiconductor film is irradiated with laser light and is processed by a photolithography method, so that the crystalline semiconductor films 1305*a* to 1305*f* are formed. Note that, the amorphous semiconductor film may be crystallized only by laser light irradiation, not by thermal crystallization using a metal element for promoting crystallization.

For a laser oscillator used for crystallization, either a continuous wave laser (a CW laser) or a pulsed wave laser (a pulsed laser) can be used. As a laser beam which can be used here, a laser beam emitted from one or more of the following can be used: a gas laser such as an Ar laser, a Kr laser, or an excimer laser; a laser of which a medium is single crystalline YAG, $YVO_4$, forsterite ($Mg_2SiO_4$), $YAlO_3$, $GdVO_4$, or polycrystalline (ceramic) YAC; $Y_2O_3$, $YVO_4$, $YAlO_3$, or $GdVO_4$ doped with one or more of Nd, Yb, Cr, Ti, Ho, Er, Tm, and Ta as a dopant; a glass laser; a ruby laser; an alexandrite laser; a Ti:sapphire laser; a copper vapor laser; and a gold vapor laser. Crystals with a large grain size can be obtained by irradiation with fundamental waves of such a laser beam or second to fourth harmonics of the fundamental waves of such a laser beam. For example, the second harmonic (532 nm) or the third harmonic (355 nm) of an Nd:YVO4 laser (fundamental wave: 1064 nm) can be used. A power density of the laser in this case needs to be about 0.01 to 100 $MW/cm^2$ (preferably, 0.1 to 10 $MW/cm^2$) and the scanning rate for the irradiation is set to be about 10 to 2000 cm/sec. Note that a laser of which a medium is single crystalline YAGQ $YVO_4$, forsterite ($Mg_2SiO_4$), $YAlO_3$, or $GdVO_4$ or polycrystalline (ceramic) YAG, $Y_2O_3$, $YVO_4$, $YAlO_3$, or $GdVO_4$ doped with one or more of Nd, Yb, Cr, Ti, Ho, Er, Tm, and Ta as a dopant; an Ar ion laser; or a Ti:sapphire laser can be used as a CW laser, whereas such a laser can also be used as a pulsed laser with a repetition rate of 10 MHz or more by a Q-switch operation, mode locking, or the like. In the case where a laser beam with a reputation rate of greater than or equal to 10 MHz is used, a semiconductor film is irradiated with the next pulse after the semiconductor film is melted by the laser and before it is solidified. Therefore, unlike the case of using a pulsed laser with a low repetition rate, a solid-liquid interface can be continuously moved in the semiconductor film, so that crystal grains which grow continuously in a scanning direction can be obtained.

Alternatively, the gate insulating film 1306 may be formed by oxidizing or nitriding the surfaces of the crystalline semiconductor films 1305a to 1305f by performing the foregoing high-density plasma treatment. For example, the gate insulating film 1306 is formed by plasma treatment in which a mixed gas of a rare gas such as He, Ar, Kr, or Xe and oxygen, nitrogen oxide, ammonia, nitrogen, hydrogen or the like is introduced. When excitation of the plasma in this case is performed by introduction of a microwave, plasma with a low electron temperature and a high density can be generated. Surfaces of semiconductor films can be oxidized or nitrided by oxygen radicals (which may include OH radicals) or nitrogen radicals (which may include NH radicals) generated by this high-density plasma.

By the treatment using such high-density plasma, an insulating film is formed over the semiconductor films to have a thickness of 1 to 20 nm, typically 5 to 10 nm. Since the reaction in this case is a solid-phase reaction, the interface state density between the insulating film and the semiconductor film can be quite low. Such high-density plasma treatment directly oxidizes (or nitrides) a semiconductor film (crystalline silicon or polycrystalline silicon), variation in thickness of the formed insulating film can be quite small, ideally. Further, crystal grain boundaries of crystalline silicon are not excessively oxidized, which makes a very preferable condition. In other words, by solid-phase oxidation of a surface of the crystalline semiconductor film by the high-density plasma treatment described here, an insulating film with good uniformity and low interface state density can be formed without excessive oxidation reaction at the crystal grain boundaries.

As the gate insulating film, an insulating film formed by high-density plasma treatment may only be used, or an insulating film of silicon oxide, silicon oxynitride, silicon nitride, or the like may be deposited by a CVD method utilizing a plasma or thermal reaction and is stacked. In any case, transistors including insulating films formed by high-density plasma as a part of gate insulating films or as the gate insulating films can have less variation in characteristics.

Further, the crystalline semiconductor films 1305a to 1305f, which are obtained by irradiating a semiconductor film with a continuous wave laser beam or a laser beam oscillated with a repetition rate of greater than or equal to 10 MHz and scanning the semiconductor film with the laser beam in one direction to crystallize the semiconductor film, have a characteristic such that the crystal grows in the scanning direction of the beam. When transistors are arranged so that the scanning direction corresponds to their channel length direction (a direction in which carriers flow when a channel formation region is formed) and the foregoing gate insulating film is combined therewith, thin film transistors (TFTs) with less characteristic variation and high field effect mobility can be obtained.

Next, a first conductive film and a second conductive film are formed to be stacked over the gate insulating film 1306. Here, the first conductive film is formed by a CVD method, a sputtering method, or the like to have a thickness of 20 to 100 nm. The second conductive film is formed to have a thickness of 100 to 400 nm. The first and the second conductive films are formed of an element selected from tantalum (Ta), tungsten (W), titanium (Ti), molybdenum (Mo), aluminum (Al), copper (Cu), chromium (Cr), niobium (Nb), and the like, or an alloy material or a compound material containing any of those elements as its main component. Alternatively, the first and the second conductive films are formed of a semiconductor material typified by polycrystalline silicon doped with an impurity element such as phosphorus. As examples of a combination of the first conductive film and the second conductive film, a tantalum nitride film and a tungsten film, a tungsten nitride film and a tungsten film, a molybdenum nitride film and a molybdenum film, and the like can be given. Since tungsten or tantalum nitride have high heat resistance, heat treatment for thermal activation can be performed after the formation of the first and the second conductive films. In addition, in the case of a three-layer structure instead of a two-layer structure, a stacked-layer structure including a molybdenum film, an aluminum film, and a molybdenum film may be employed.

Next, a mask formed of a resist is formed by a photolithography method, and etching treatment is performed for forming a gate electrode and a gate wiring. Thus, gate electrodes 1307 are formed over the crystalline semiconductor films 1305a to 1305f. Here, an example in which the gate electrode 1307 has a stacked-layer structure including a first conductive film 1307a and a second conductive film 1307b is described.

Figure 18C:
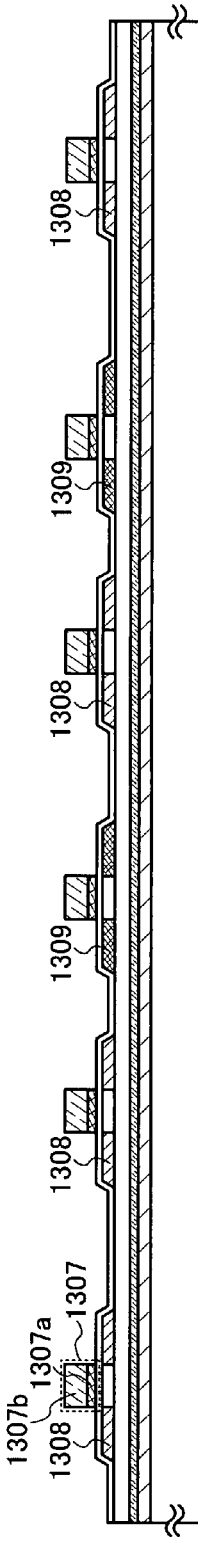

Next, the crystalline semiconductor films 1305a to 1305f are doped with an impurity element imparting n-type conductivity at low concentration by an ion doping method or an ion implantation method with the use of the gate electrodes 1307 as masks. Then, a mask formed of a resist is formed selectively by a photolithography method, and an impurity element imparting p-type conductivity is added at high concentration. As the n-type impurity element, phosphorus (P), arsenic (As), or the like can be used. As the p-type impurity element, boron (B), aluminum (Al), gallium (Ga), or the like can be used. Here, phosphorus (P) is used as the impurity element imparting n-type conductivity and is selectively introduced into the crystalline semiconductor films 1305a to 1305f so as to be contained with a concentration of $1 \times 10^{15}$ to $1 \times 10^{19}/cm^3$; thus, n-type impurity regions 1308 are formed. Thus, boron (B) is used as the impurity element imparting p-type conductivity and is selectively introduced into the crystalline semiconductor films 1305c and 1305e so as to be contained with a concentration of $1 \times 10^{19}$ to $1 \times 10^{20}/cm^3$; thus, p-type impurity regions 1309 are formed (see FIG. 18C).

Next, an insulating film is formed so as to cover the gate insulating film 1306 and the gate electrodes 1307. The insulating film is formed to have a single layer or stack layer of a film containing an inorganic material such as silicon, oxide of silicon, or nitride of silicon, or a film containing an organic material such as an organic resin, by a plasma CVD method, a sputtering method, or the like. Then, the insulating film is selectively etched by anisotropic etching mainly in the perpendicular direction, so that insulating films 1310 (also referred to as side walls) which are in contact with side surfaces of the gate electrodes 1307 are formed. The insulating films 1310 are used as masks in doping for forming lightly doped drain (LDD) regions.

Next, the crystalline semiconductor films 1305a, 1305b, 1305d, and 1305f are doped with an impurity element imparting n-type conductivity at high concentration with the use of a mask formed of a resist by a photolithography method, and the gate electrode 1307, and the insulating films 1310 as masks. Thus, n-type impurity regions 1311 are formed. Here, phosphorus (P) is used as the impurity element imparting n-type conductivity and is selectively introduced into the crystalline semiconductor films 1305a, 1305b, 1305d, and 1305f so as to be contained with a concentration of $1 \times 10^{19}$ to $1 \times 10^{20}/cm^3$; thus, the n-type impurity regions 1311 with higher concentration of impurity than the impurity regions 1308 are formed.

Figure 18D:
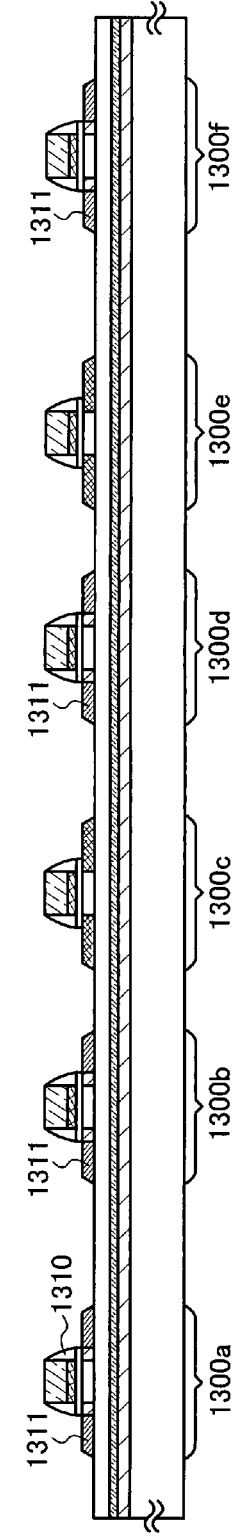

Through the foregoing steps, n-channel thin film transistors 1300a, 1300b, 1300d, and 1300f, and p-channel thin film transistors 1300c and 1300e are formed (see FIG. 18D).

In the n-channel thin film transistor 1300a, a channel formation region is formed in a region in the crystalline semiconductor film 1305a which overlaps with the gate electrode 1307, the impurity region 1311 forming a source region or a drain region is formed in a region which does not overlap with the gate electrode 1307 and the insulating film 1310, and a lightly doped drain region (LDD region) is formed in a region which overlaps with the insulating film 1310 and which is between the channel formation region and the impurity region 1311. Also in each of the n-channel thin film transistors 1300b, 1300d, and 1300f, a channel formation region, a lightly doped drain region, and the impurity region 1311 are formed in a similar manner.

In the p-channel thin film transistor 1300c, a channel formation region is formed in a region in the crystalline semiconductor film 1305c which overlaps with the gate electrode 1307, and the impurity region 1309 forming a source region or a drain region is formed in a region which does not overlap with the gate electrode 1307. Also in the p-channel thin film transistor 1300e, a channel formation region and the impurity region 1309 are formed in a similar manner. Note that although an LDD region is not provided in the p-channel thin film transistors 1300c and 1300e, the LDD region may be provided in the p-channel thin film transistor or the n-channel thin film transistor may have a structure without LDD regions.

Figure 19A:
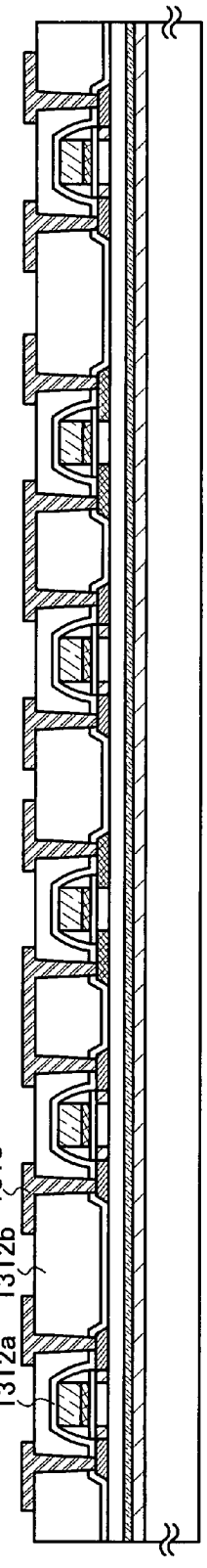
FIGS. 19A to 19C illustrate an example of a method of manufacturing a semiconductor device of the present invention.

Next, a single layer or stack layer of an insulating film is formed so as to cover the crystalline semiconductor films 1305a to 1305f, the gate electrodes 1307, and the like; and conductive films 1313 which are electrically connected to the impurity regions 1309 and 1311 which form source regions or drain regions in the thin film transistors 1300a to 1300f are formed over the insulating film (see FIG. 19A). The insulating film is formed to have a single layer or stack layer of an inorganic material such as oxide of silicon or nitride of silicon, an organic material such as polyimide, polyamide, benzocyclobutene, acrylic, or epoxy, a siloxane material, or the like, by a CVD method, a sputtering method, an SOG method, a droplet discharging method, a screen printing method, or the like. Here, the insulating film has a two-layer structure, in which a silicon nitride oxide film is formed as a first insulating film 1312a, and a silicon oxynitride film is formed as a second insulating film 1312b. In addition, the conductive films 1313 can form source electrodes or drain electrodes of the thin film transistors 1300a to 1300f.

Note that, before the insulating films 1312a and 1312b are formed or after one or both of thin films of the insulating films 1312a and 1312b are formed, heat treatment may be performed for recovering the crystallinity of the semiconductor film, for activating the impurity elements which has been added into the semiconductor film, or for hydrogenating the semiconductor film. As this heat treatment, thermal annealing, a laser annealing method, an RTA method, or the like may be employed.

The conductive film 1313 is formed to have a single layer or stack layer of an element selected from, aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), and silicon (Si), or an alloy material or a compound material containing any of those elements as its main component by a CVD method, a sputtering method, or the like. An alloy material containing aluminum as its main component corresponds to, for example, a material which contains aluminum as its main component and also contains nickel, or an alloy material which contains aluminum as its main component and which also contains nickel and one or both carbon and silicon. The conductive film 1313 preferably employs, for example, a stack-layer structure including a barrier film, an aluminum-silicon (Al—Si) film, and a barrier film, or a stack-layer structure including a barrier film, an aluminum-silicon (Al—Si) film, a titanium nitride film, and a barrier film. Note that the barrier film refers to a thin film formed of titanium, nitride of titanium, molybdenum, or nitride of molybdenum. Aluminum and aluminum silicon have low resistance and are inexpensive; therefore, they are optimal materials for forming the conductive film 1313. In addition, generation of a hillock of aluminum or aluminum silicon can be prevented when upper and lower barrier layers are formed. Furthermore, when the barrier film is formed of titanium, which is an element with a high reducing property, even when a thin natural oxide film is formed on a crystalline semiconductor film, the natural oxide film can be reduced; so that preferable contact with the crystalline semiconductor film can be obtained.

Next, an insulating film 1314 is formed so as to cover the conductive films 1313. And then, conductive films 1315a and 1315b to be electrically connected to the conductive films 1313, which form the source electrodes or drain electrodes of the thin film transistors 1300a and 1300f are formed over the insulating film 1314. A conductive film 1316 to be electrically connected to the conductive film 1313, which forms the source electrode or drain electrode of the thin film transistor 1300b is formed. Note that the conductive films 1315a and 1315b and the conductive film 1316 may be formed of the same material at the same time. The conductive films 1315a and 1315b and the conductive film 1316 can be formed of any of the foregoing materials which are given as materials for the conductive film 1313.

Figure 19B:
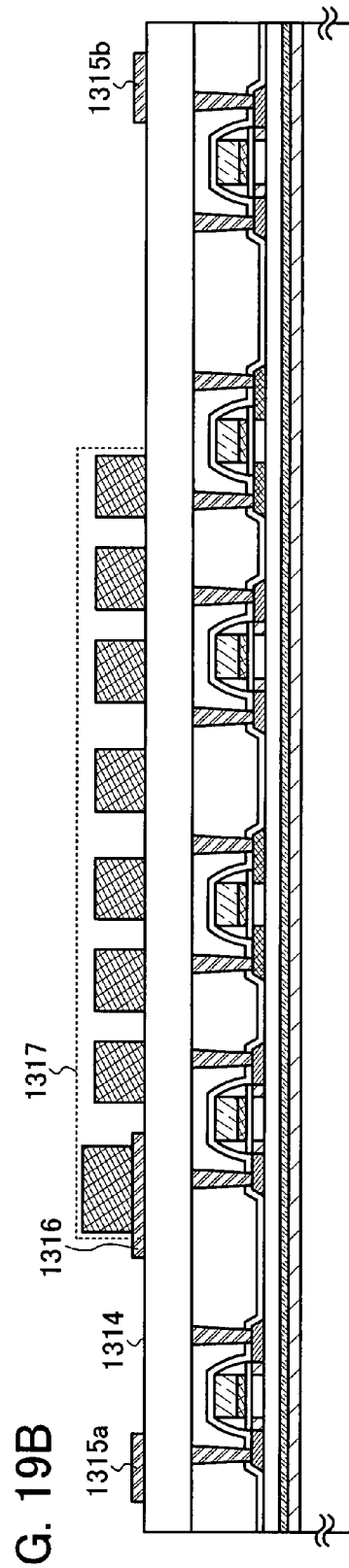

Next, a conductive film 1317 which serves as an antenna is formed so as to be electrically connected to the conductive film 1316 (see FIG. 19B).

The insulating film 1314 can be formed to have a single-layer or stack-layer structure of an insulating film containing oxygen and/or nitrogen such as silicon oxide ($SiO_x$), silicon nitride ($SiN_x$), silicon oxynitride ($SiO_xN_y$) (x>y), or silicon nitride oxide ($SiN_xO_y$) (x>y), a film containing carbon such as DLC (Diamond-Like Carbon), a film of an organic material such as epoxy, polyimide, polyamide, polyvinyl phenol, benzocyclobutene, or acrylic, or a film of a siloxane material such as a siloxane resin, which are formed by a CVD method, a sputtering method, or the like. Note that a siloxane material refers to a material including a Si—O—Si bond. Siloxane has a skeleton structure containing a bond of silicon (Si) and oxygen (O). As a substituent, an organic group containing at least hydrogen (e.g., an alkyl group or aromatic hydrocarbon) is used. Alternatively, a fluoro group can be used as the substituent. Further alternatively, both an organic group containing at least hydrogen and a fluoro group may be used as the substituent.

The conductive film 1317 is formed of a conductive material by using a CVD method, a sputtering method, a printing method such as a screen printing method or a gravure printing method, a droplet discharging method, a dispensing method, a plating method, or the like. The conductive material is an element selected from aluminum (Al), titanium (Ti), silver (Ag), copper (Cu), gold (Au), platinum (Pt), nickel (Ni), palladium (Pd), tantalum (Ta), and molybdenum (Mo), or an alloy material or a compound material containing any of those elements as its main component. The conductive film is formed to have a single-layer or stack-layer structure.

For example, in the case of forming the conductive film 1317 which serves as the antenna by using a screen printing method, the conductive film 1317 can be provided by selectively printing a conductive paste in which conductive particles having a grain size of several nanometers to several tens of micrometers are dissolved or dispersed in an organic resin. As the conductive particles, metal particles of one or more of silver (Ag), gold (Au), copper (Cu), nickel (Ni), platinum (Pt), palladium (Pd), tantalum (Ta), molybdenum (Mo), titanium (Ti), and the like, fine particles of silver halide, or dispersing nanoparticles thereof can be used. In addition, as the organic resin contained in the conductive paste, one or more of organic resins selected from organic resins which serve as a binder, a solvent, a dispersing agent, and a coating member for the metal particles can be used. Typically, an organic resin such as an epoxy resin or a silicone resin can be used. Further, in the formation of the conductive film, baking is preferably performed after the conductive paste is applied. For example, in the case of using fine particles (with the grain size of, for example, grater or equal to 1 nm and less than or equal to 100 nm) containing silver as its main component as a material for the conductive paste, the conductive paste is baked and hardened at temperatures of 150 to 300° C., so that the conductive film can be obtained. Alternatively, fine particles containing solder or lead-free solder as its main component may be used; in that case, fine particles having a grain size of less than or equal to 20 μm are preferably used. Solder or lead-free solder has advantages of low cost.

The conductive films 1315a and 1315b can serve as wirings which are electrically connected to a secondary battery included in the semiconductor device of the present invention in a later step. In addition, in forming the conductive film 1317 which serves as an antenna, other conductive films may be separately formed so as to be electrically connected to the conductive films 1315a and 1315b and the conductive films can be utilized as the wirings for connecting the conductive films 1315a and 1315b to the secondary battery.

Figure 19C:
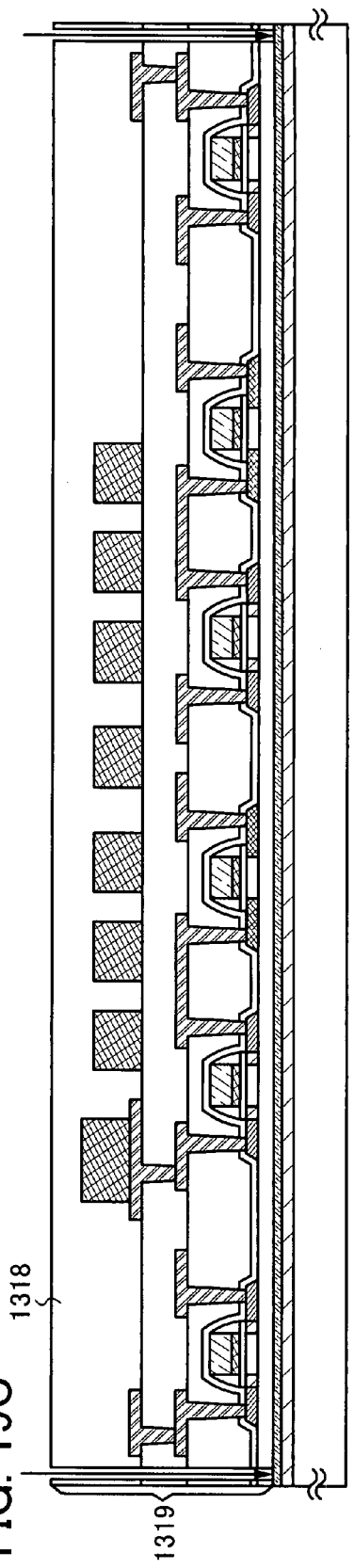

Next, an insulating film 1318 is formed so as to cover the conductive film 1317, after that, a layer including the thin film transistors 1300a to 1300f, the conductive film 1317, and the like (hereinafter, referred to as an element formation layer 1319) is peeled off from the substrate 1301. Here, openings are formed by laser light (e.g., UV light) irradiation in regions where the thin film transistors 1300a to 1300f are not formed (see FIG. 19C), then, the element formation layer 1319 can be peeled off from the substrate 1301 by physical force. Alternatively, an etchant may be introduced into the formed openings so as to selectively remove the separation layer 1303 before the element formation layer 1319 is peeled off from the substrate 1301. As the etchant, gas or liquid containing halogen fluoride or an interhalogen compound is used. For example, when chlorine trifluoride ($ClF_3$) is used as a gas containing halogen fluoride, the element formation layer 1319 is peeled off from the substrate 1301. Note that the separation layer 1303 may be partially left instead of being removed completely. By leaving the separation layer 1303 partially, consumption of the etchant can be reduced and the time for removing the separation layer can be shortened, as well as the element formation layer 1319 can be held over the substrate 1301 even after the separation layer 1303 is removed. Further, the substrate 1301 is reused after the element formation layer 1319 is peeled off; whereby cost can be reduced.

The insulating film 1318 can be formed to have a single-layer or stack-layer structure of an insulating film containing oxygen and/or nitrogen such as silicon oxide ($SiO_x$), silicon nitride ($SiN_x$), silicon oxynitride ($SiO_xN_y$) (x>y), or silicon nitride oxide ($SiN_xO_y$) (x>y), a film containing carbon such as DLC (Diamond-Like Carbon), a film of an organic material such as epoxy, polyimide, polyamide, polyvinyl phenol, benzocyclobutene, or acrylic, or a film of a siloxane material such as a siloxane resin by a CVD method, a sputtering method, or the like.

Figure 20A:
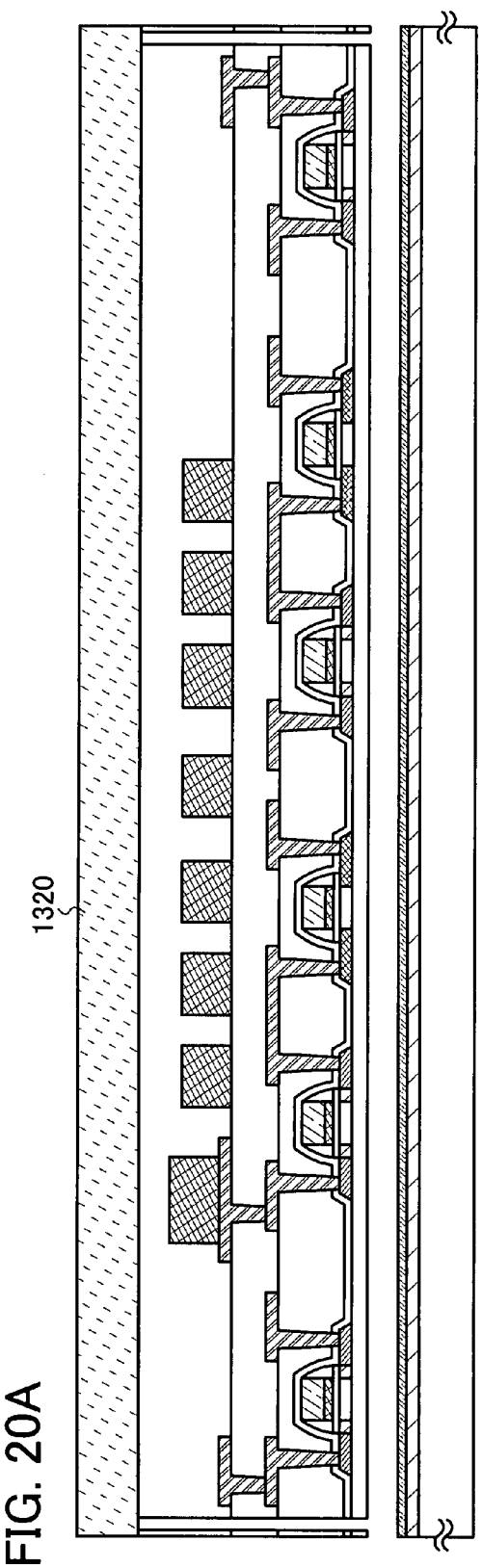
FIGS. 20A and 20B illustrate an example of a method of manufacturing a semiconductor device of the present invention.

In this embodiment mode, after the openings are formed in the element formation layer 1319 by laser light irradiation, a first sheet material 1320 is attached to one surface of the element formation layer 1319 (the surface where the insulating film 1318 is exposed), and then, the element formation layer 1319 is peeled off from the substrate 1301 (see FIG. 20A).

Figure 20B:
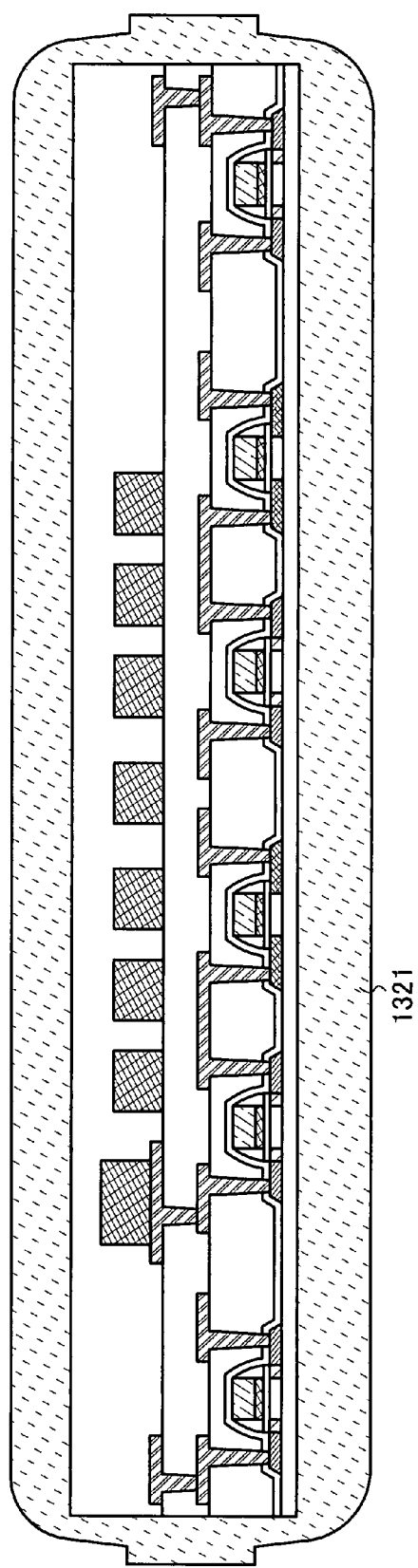

Next, a second sheet material 1321 is provided on the other surface (the surface exposed by peeling) of the element formation layer 1319, then, the second sheet material 1321 is attached to the surface by one or both heat treatment and pressure treatment (see FIG. 20B). As the first sheet material 1320 and the second sheet material 1321, a hot-melt film or the like can be used.

As the first sheet material 1320 and the second sheet material 1321, a film on which antistatic treatment for preventing static electricity or the like is performed (hereinafter referred to as an antistatic film) can be used. As examples of the antistatic film, a film in which an antistatic material is dispersed in a resin, a film provided with an antistatic material attached thereon, or the like can be given. The film provided with an antistatic material may be a film provided with an antistatic material on one of its surfaces, or a film provided with an antistatic material on its opposing surfaces. As for the film provided with an antistatic material on one of its surfaces, the film may be attached to the layer so that the antistatic material is placed on the inner side of the film or the outer side of the film. Note that the antistatic material may be provided on the entire surface of the film, or on a part thereof. As the antistatic material here, a metal, indium tin oxide (ITO), a surfactant such as an amphoteric surfactant, a cationic surfactant, or a nonionic surfactant can be used. Further, as an antistatic material, a resin material containing cross-linked copolymer having a carboxyl group and a quaternary ammonium base on its side chain, or the like can be used. Such a material is attached, mixed, or applied to a film, to form an antistatic film. The element formation layer is sealed using the antistatic film, so that the semiconductor elements can be protected from adverse effects such as external static electricity when being handled as a commercial product.

Note that a thin-film secondary battery is connected to the conductive films 1315a and 1315b, so that the storage capacitor of the power supply circuit is formed. The connection with the secondary battery may be made before the element formation layer 1319 is peeled off from the substrate 1301 (at the stage shown in FIG. 19B or FIG. 19C), after the element formation layer 1319 is peeled off from the substrate 1301 (at the stage shown in FIG. 20A), or after the element formation layer 1319 is sealed with the first sheet material and the second sheet material (at the stage shown in FIG. 20B). An example in which the element formation layer 1319 and the secondary battery are formed to be connected is described below with reference to FIGS. 21A to 22B.

In FIG. 21A, conductive films 1331a and 1331b which are electrically connected to the conductive films 1315a and 1315b, respectively, are formed at the same time as the conductive film 1317 which serves as an antenna. Next, the insulating film 1318 is formed so as to cover the conductive film 1317 and the conductive films 1331a and 1331b. Then, openings 1332a and 1332b are formed so as to expose surfaces of the conductive films 1331a and 1331b. After that, the opening portions are formed in the element formation layer 1319 by laser irradiation, and then the first sheet material 1320 is attached to one surface of the element formation layer 1319 (the surface where the insulating film 1318 is exposed), so that the element formation layer 1319 is peeled off from the substrate 1301 (see FIG. 21A).

Next, the second sheet material 1321 is attached to the other surface of the element formation layer 1319 (the surface exposed by peeling), and the element formation layer 1319 is peeled off from the first sheet material 1320. Therefore, a material with low viscosity is used as the first sheet material 1320. Then, conductive films 1334a and 1334b which are electrically connected to the conductive films 1331a and 1331b, respectively through the opening 1332a and 1332b are selectively formed (see FIG. 21B).

The conductive films 1334a and 1334b are formed of a conductive material by a CVD method, a sputtering method, a printing method such as screen printing or gravure printing, a droplet discharging method, a dispenser method, a plating method, or the like. The conductive material is any of the elements selected from aluminum (Al), titanium (Ti), silver (Ag), copper (Cu), gold (Au), platinum (Pt), nickel (Ni), palladium (Pd), tantalum (Ta), and molybdenum (Mo), or an alloy material or a compound material containing any of those elements as its main component. The conductive films are formed to have a single-layer or stacked-layer structure.

Although the example shown here is the case where the conductive films 1334a and 1334b are formed after peeling the element formation layer 1319 off from the substrate 1301, the element formation layer 1319 may be peeled off from the substrate 1301 after the formation of the conductive films 1334a and 1334b.

Figure 22A:
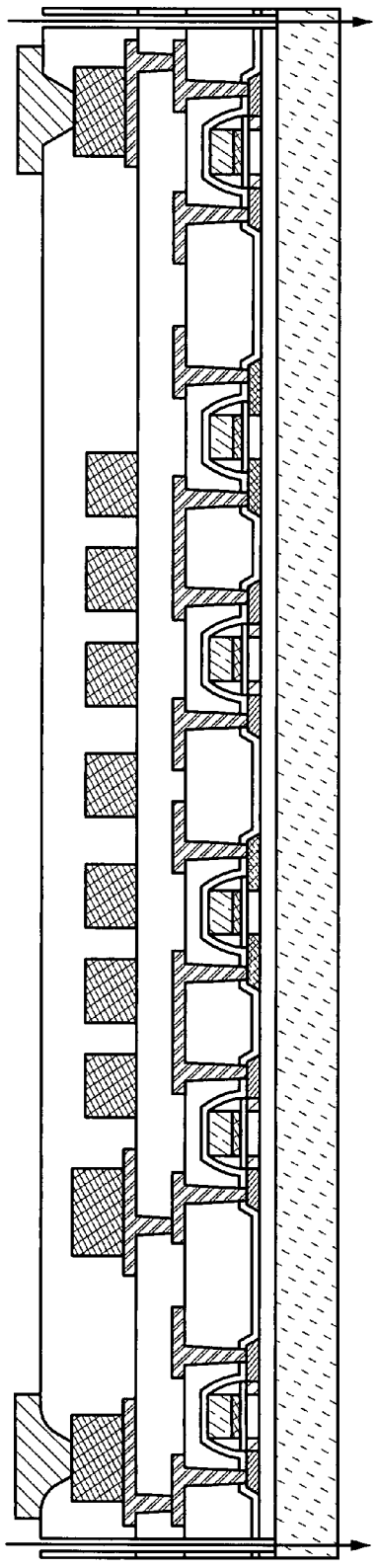
FIGS. 22A and 22B illustrate an example of a method of manufacturing a semiconductor device of the present invention.

Next, in the case where a plurality of elements are formed over the substrate, the element formation layer 1319 is cut into elements (see FIG. 22A). A laser irradiation apparatus, a dicing apparatus, a scribing apparatus, or the like can be used for the cutting. At this time, the plurality of elements formed over one substrate are separated from one another by laser light irradiation.

Figure 22B:
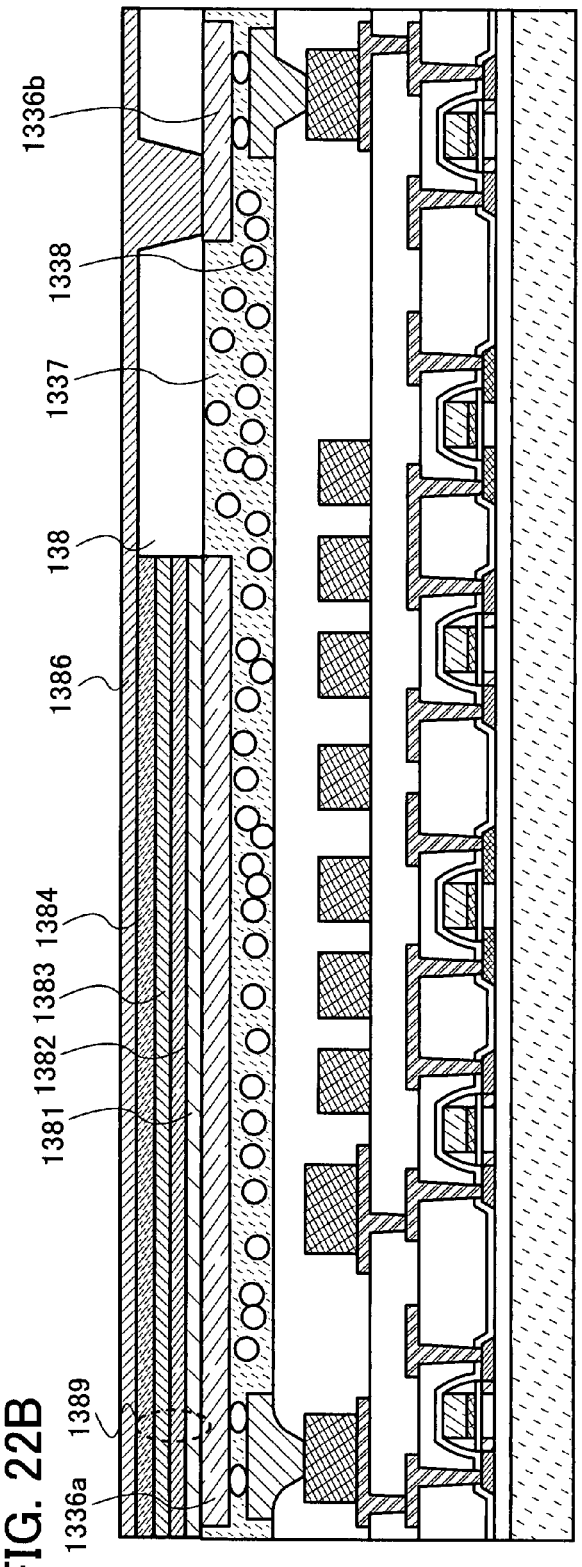

Next, the separated elements are electrically connected to the secondary battery (see FIG. 22B). In this embodiment mode, a thin-film secondary battery is used as the storage capacitor of the power supply circuit, in which a current-collecting thin film, a negative electrode active material layer, a solid electrolyte layer, a positive electrode active material layer, and a current-collecting thin film are stacked in this order.

Conductive films 1336a and 1336b are formed of a conductive material by a CVD method, a sputtering method, a printing method such as screen printing or gravure printing, a droplet discharging method, a dispenser method, a plating method, or the like. The conductive material is an element selected from aluminum (Al), titanium (Ti), silver (Ag), copper (Cu), gold (Au), platinum (Pt), nickel (Ni), palladium (Pd), tantalum (Ta), and molybdenum (Mo), or an alloy material or a compound material containing any of those elements as its main component. The conductive films are formed to have a single-layer or stack-layer structure. The conductive material needs to have high adhesion to a negative electrode active substance as well as low resistance. In particular, aluminum, copper, nickel, vanadium, or the like is preferably used.

The structure of a thin-film secondary battery 1389 is described next. A negative electrode active material layer 1381 is formed over the conductive film 1336a. In general, vanadium oxide ($V_2O_5$) or the like is used. Next, a solid electrolyte layer 1382 is formed over the negative electrode active material layer 1381. In general, lithium phosphate ($Li_3PO_4$) or the like is used. Next, a positive electrode active material layer 1383 is formed over the solid electrolyte layer 1382. In general, lithium manganate ($LiMn_2O_4$) or the like is used. Lithium cobaltate ($LiCoO_2$) or lithium nickel oxide ($LiNiO_2$) may also be used. Next, a current-collecting thin film 1384 to serve as an electrode is formed over the positive electrode active material layer 1383. The current-collecting thin film 1384 needs to have high adhesion to the positive electrode active material layer 1383 as well as low resistance. For example, aluminum, copper, nickel, vanadium, or the like can be used.

Each of the above thin layers of the negative electrode active material layer 1381, the solid electrolyte layer 1382, the positive electrode active material layer 1383, and the current-collecting thin film 1384 may be formed by a sputtering technique or an evaporation technique. In addition, the thickness of each layer is preferably 0.1 to 3 μm.

Next, an interlayer film 1385 is formed by application of a resin. The interlayer film is etched to form a contact hole. The interlayer film is not limited to a resin, and another film such as a CVD oxide film may be used as well; however, a resin is preferably used in terms of flatness. Alternatively, the contact hole may be formed without using etching, but using a photosensitive resin. Next, a wiring layer 1386 is formed over the interlayer film and is connected to the conductive film 1336b. Thus, an electrical connection between the thin-film secondary battery 1389 and the elements is secured.

Here, the conductive films 1334a and 1334b which are provided in the element formation layer 1319 are connected to the conductive films 1336a and 1336b, which serve as connection terminals of the thin-film secondary battery 1389, respectively in advance. Here, an example is shown in which an electrical connection between the conductive films 1334a and 1336a or an electrical connection between the conductive films 1334b and 1336b is performed by pressure bonding with an adhesive material such as an anisotropic conductive film (ACF) or an anisotropic conductive paste (ACP) therebetween. Here, an example is shown in which the connection is performed using conductive particles 1338 included in an adhesive resin 1337. Alternatively, a conductive adhesive such as a silver paste, a copper paste, or a carbon paste; solder joint; or the like can be used for the connection.

The structures of such transistors can be various and is not limited to the specific structures shown in this embodiment mode. For example, a multi-gate structure having two or more gate electrodes may be employed. When a multi-gate structure is employed, a structure in which channel regions are connected in series is provided; therefore, a structure in which a plurality of transistors are connected in series is provided. When a multi-gate structure is employed for the transistor, off-current can be reduced; withstand voltage of the transistor can be increased, so that the reliability is increased; and even if drain-source voltage changes when the transistor operates in the saturation region, a drain-source current does not change very much, and thus flat characteristics can be obtained. Further, a structure in which gate electrodes are formed above and below a channel may also be employed. When the structure in which gate electrodes are provided above and below a channel is employed, the channel region is enlarged and the amount of current flowing therethrough can be increased. Thus, a depletion layer can be easily formed and the subthreshold swing can be decreased. When gate electrodes are formed above and below a channel, a structure in which a plurality of transistors are connected in parallel is made.

Alternatively, the transistor may have any of the following structures: a structure in which a gate electrode is provided above a channel, a structure in which a gate electrode is provided below a channel, a staggered structure, and an inverted staggered structure. Further alternatively, a structure in which a channel region is divided into a plurality of regions and the divided channel regions are connected in parallel or in series. In addition, a channel (or a part thereof) may overlap with a source electrode or a drain electrode. When a structure in which a channel (or a part thereof) overlaps with a source electrode or a drain electrode is employed, electric charges can be prevented from being accumulated in a part of the channel and thus an unstable operation can be prevented. Further, an LDD region may be provided. When an LDD region is provided, off-current can be reduced; the withstand voltage of the transistor can be increased, so that the reliability is increased; and even if drain-source voltage changes when the transistor operates in the saturation region, drain-source current does not change very much, and thus flat characteristics can be obtained.

Note that a method of manufacturing a semiconductor device in this embodiment mode can be applied to a semiconductor device in another embodiment mode described in this specification.

Embodiment Mode 5

In this embodiment mode, an example of a method of manufacturing a semiconductor device described in any of the foregoing embodiment modes is described with reference to drawing. This embodiment mode describes a structure in which a communication control circuit, a rectifier circuit, a charge control circuit, and the like in the semiconductor device are formed over one substrate. Note that the communication control circuit, the rectifier circuit, the charge control circuit, and the like in the semiconductor device are formed at a time over the substrate using transistors including channel formation regions formed using a single crystalline substrate. When transistors formed using a single crystalline substrate are used as the transistors, a semiconductor device having transistors with few characteristic variations can be formed, which is preferable. In addition, this embodiment mode describes an example in which the thin-film secondary battery described in Embodiment Mode 4 is used as a battery.

Figure 11A:
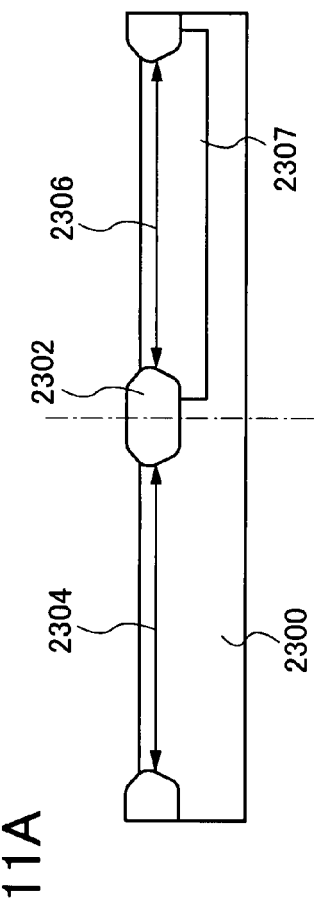
FIGS. 11A to 11C illustrate an example of a method of manufacturing a semiconductor device of the present invention.

First, an insulating film (also referred to as a field oxide film) 2302 is formed on a semiconductor substrate 2300 to separate regions (also referred to as element formation regions or element separation regions) 2304 and 2306 (see FIG. 11A). The regions 2304 and 2306 provided in the semiconductor substrate 2300 are insulated from each other by the insulating film 2302. The example shown here is the case where a single crystal Si substrate having n-type conductivity is used as the semiconductor substrate 2300, and a p-well 2307 is formed in the region 2306 in the semiconductor substrate 2300.

Any substrate can be used as the semiconductor substrate 2300 as long as it is a semiconductor substrate. For example, a single crystal Si substrate having n-type or p-type conductivity, a compound semiconductor substrate (e.g., a GaAs substrate, an InP substrate, a GaN substrate, a SiC substrate, a sapphire substrate, or a ZnSe substrate), an SOI (silicon on insulator) substrate formed by a bonding method or a SIMOX (separation by implanted oxygen) method, or the like can be used.

The regions 2304 and 2306 can be formed by appropriately using a local oxidation of silicon (LOCOS) method, a trench isolation method, or the like.

In addition, the p-well formed in the region 2306 in semiconductor substrate 2300 can be formed by selective doping of the semiconductor substrate 2300 with a p-type impurity element. As a p-type impurity element, boron (B), aluminum (Al), gallium (Ga), or the like can be used.

In this embodiment mode, although the region 2304 is not doped with an impurity element because a semiconductor substrate having n-type conductivity is used as the semiconductor substrate 2300, an n-well may be formed in the region 2304 by doping with an n-type impurity element. As an n-type impurity element, phosphorus (P), arsenic (As), or the like can be used. When a semiconductor substrate having p-type conductivity is used, on the other hand, the region 2304 may be doped with an n-type impurity element to form an n-well, whereas the region 2306 may be doped with no impurity element.

Figure 11B:
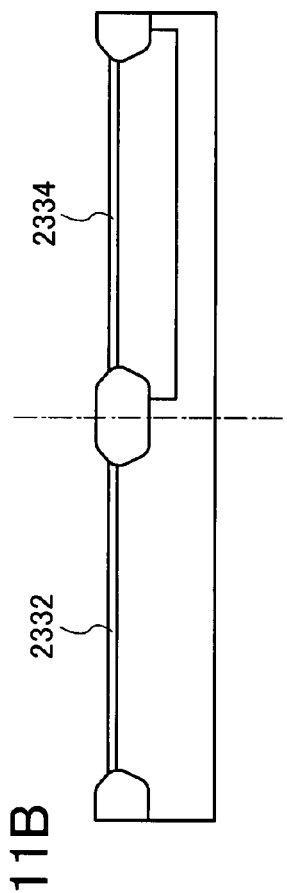

Next, insulating films 2332 and 2334 are formed so as to cover the regions 2304 and 2306, respectively (see FIG. 11B).

For example, surfaces of the regions 2304 and 2306 provided in the semiconductor substrate 2300 are oxidized by heat treatment, so that the insulating films 2332 and 2334 can be formed of silicon oxide films. Alternatively, the insulating films may be formed to have a stack-layer structure of a silicon oxide film and a film containing oxygen and nitrogen (a silicon oxynitride film) by forming a silicon oxide film by a thermal oxidation method and then nitriding the surface of the silicon oxide film by nitridation treatment.

Further alternatively, the insulating films 2332 and 2334 may be formed by plasma treatment as described above. For example, the insulating films 2332 and 2334 can be formed using a silicon oxide ($SiO_x$) film or a silicon nitride ($SiN_x$) film which is obtained by application of oxidation or nitridation treatment using high-density plasma to the surfaces of the regions 2304 and 2306 provided in the semiconductor substrate 2300. Furthermore, after applying oxidation treatment using high-density plasma to the surfaces of the regions 2304 and 2306, nitridation treatment using high-density plasma may be performed. In that case, silicon oxide films are formed on the surfaces of the regions 2304 and 2306, and then silicon oxynitride films are formed on the silicon oxide films. Thus, the insulating films 2332 and 2334 are each formed to have a stack-layer structure including the silicon oxide film and the silicon oxynitride film. After the silicon oxide films are formed on the surfaces of the regions 2304 and 2306 by a thermal oxidation method, oxidation or nitridation treatment using high-density plasma may be applied to the silicon oxide films.

The insulating films 2332 and 2334 formed over the regions 2304 and 2306 in the semiconductor substrate 2300 serve as the gate insulating films of transistors which are completed later.

Figure 11C:
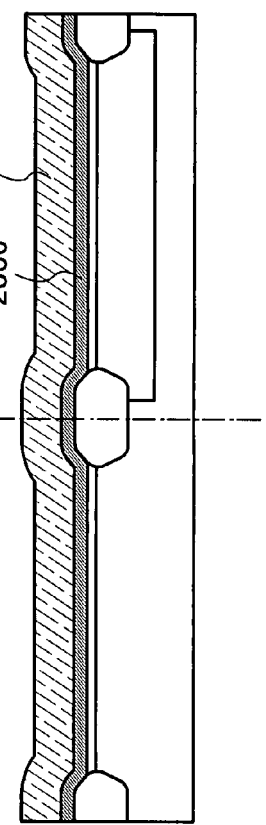

Next, a conductive film is formed so as to cover the insulating films 2332 and 2334, which are formed over the regions 2304 and 2306, respectively (see FIG. 11C). Here, an example is shown in which the conductive film is formed by sequentially stacking conductive films 2336 and 2338. Needless to say, the conductive film may be formed to have a single layer or a stack-layer structure of three or more layers.

As materials of the conductive films 2336 and 2338, an element selected from tantalum (Ta), tungsten (W), titanium (Ti), molybdenum (Mo), aluminum (Al), copper (Cu), chromium (Cr), niobium (Nb), and the like, or an alloy material or a compound material containing any of those elements as its main component can be used. Alternatively, a metal nitride film obtained by nitridation of any of those elements can be used. Further alternatively, a semiconductor material typified by polycrystalline silicon doped with an impurity element such as phosphorus can be used.

Here, a stack-layer structure is provided including the conductive film 2336 formed using tantalum nitride and the conductive film 2338 formed thereon using tungsten. Alternatively, the conductive film 2336 can be formed to have a single-layer or stack-layer film using any of tungsten nitride, molybdenum nitride, or titanium nitride, and the conductive film 2338 can be formed to have a single-layer or stack-layer film using any of tungsten, tantalum, molybdenum, or titanium.

Figure 12A:
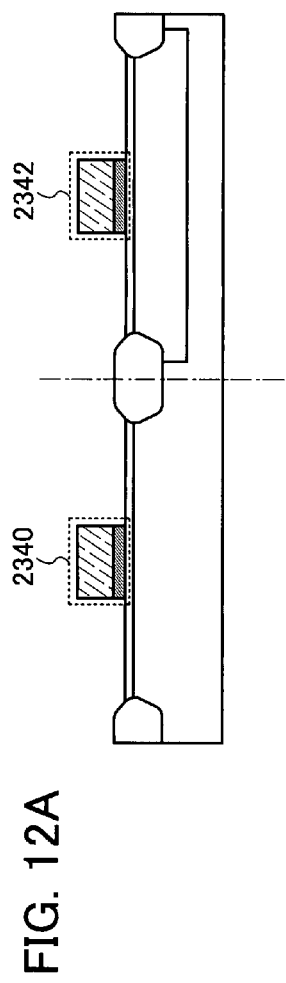
FIGS. 12A to 12C illustrate an example of a method of manufacturing a semiconductor device of the present invention.

Next, the stacked conductive films 2336 and 2338 are selectively removed by etching, so that the conductive films 2336 and 2338 remain above parts of the regions 2304 and 2306. Thus, gate electrodes 2340 and 2342 are formed (see FIG. 12A).

Figure 12B:
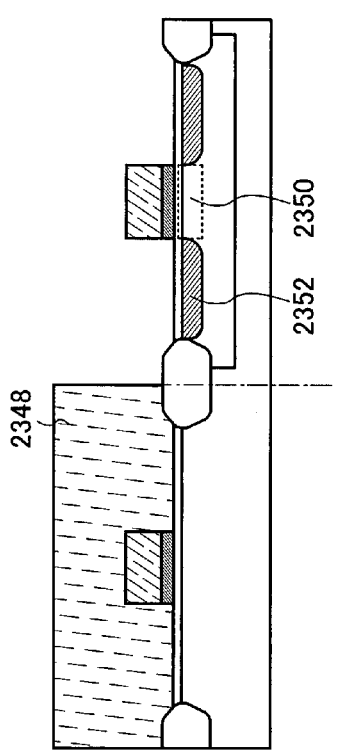

Next, a resist mask 2348 is selectively formed so as to cover the region 2304, and the region 2306 is doped with an impurity element, using the resist mask 2348 and the gate electrode 2342 as masks, so that impurity regions are formed (see FIG. 12B). As an impurity element, an n-type impurity element or a p-type impurity element is used. As an n-type impurity element, phosphorus (P), arsenic (As), or the like can be used. As a p-type impurity element, boron (B), aluminum (Al), gallium (Ga), or the like can be used. Here, phosphorus (P) is used as the impurity element.

In FIG. 12B, by doping with an impurity element, impurity regions 2352 which form source and drain regions and a channel formation region 2350 are formed in the region 2306.

Figure 12C:
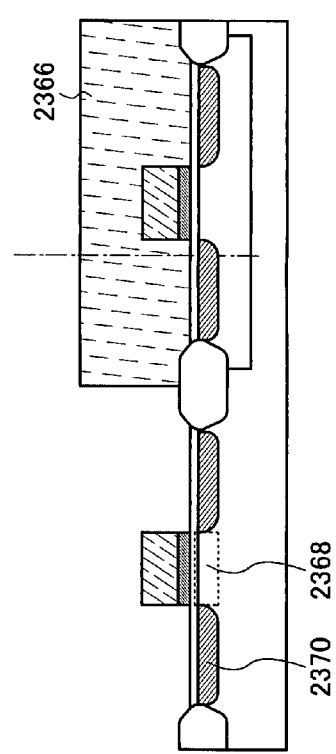

Next, a resist mask 2366 is selectively formed so as to cover the region 2306, and the region 2304 is doped with an impurity element, using the resist mask 2366 and the gate electrode 2340 as masks, so that impurity regions are formed (see FIG. 12C). As the impurity element, an n-type impurity element or a p-type impurity element is used. As an n-type impurity element, phosphorus (P), arsenic (As), or the like can be used. As a p-type impurity element, boron (B), aluminum (Al), gallium (Ga), or the like can be used. Here, an impurity element (e.g., boron (B)) of a conductivity type different from that of the impurity element introduced into the region 2306 in FIG. 12B is used. As a result, impurity regions 2370 which form source and drain regions and a channel formation region 2368 are formed in the region 2304.

Figure 13A:
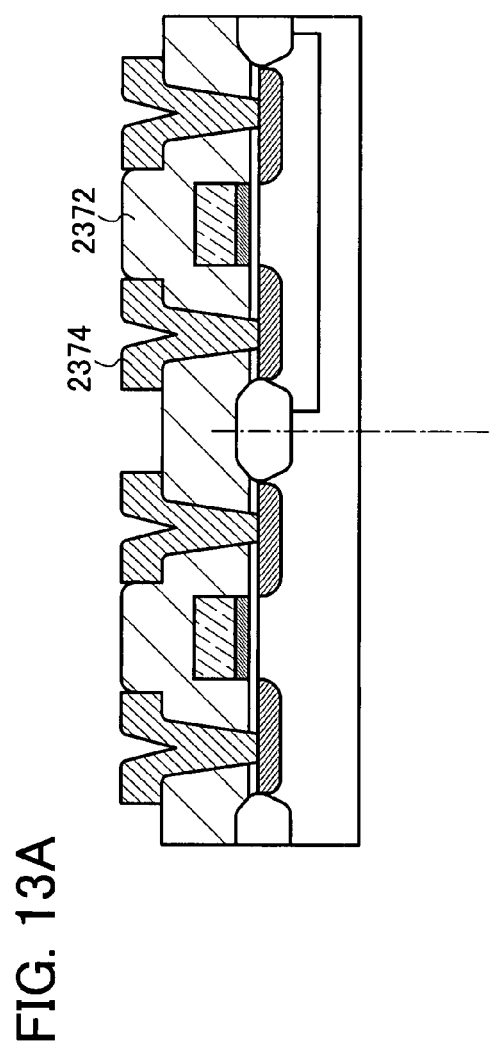
FIGS. 13A and 13B illustrate an example of a method of manufacturing a semiconductor device of the present invention.

Next, a second insulating film 2372 is formed so as to cover the insulating films 2332 and 2334 and the gate electrodes 2340 and 2342. Then, wiring 2374, which are electrically connected to the impurity regions 2352 and 2370 formed in the regions 2306 and 2304 respectively, are formed over the second insulating film 2372 (see FIG. 13A).

The second insulating film 2372 can be formed to have a single-layer or stack-layer structure of an insulating film containing oxygen and/or nitrogen such as silicon oxide ($SiO_x$), silicon nitride ($SiN_x$), silicon oxynitride ($SiO_xN_y$) (x>y), or silicon nitride oxide ($SiN_xO_y$) (x>y), a film containing carbon such as DLC (Diamond-Like Carbon), a film of an organic material such as epoxy, polyimide, polyamide, polyvinyl phenol, benzocyclobutene, or acrylic, or a film of a siloxane material such as a siloxane resin, which are formed by a CVD method, a sputtering method, or the like. Note that a siloxane material refers to a material including a Si—O—Si bond. Siloxane has a skeleton structure containing a bond of silicon (Si) and oxygen (O). As a substituent, an organic group containing at least hydrogen (e.g., an alkyl group or aromatic hydrocarbon) is used. Alternatively, a fluoro group can be used as the substituent. Further alternatively, both an organic group containing at least hydrogen and a fluoro group may be used as the substituent.

The wiring 2374 is formed to have a single layer or stack layer of an element selected from, aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), and silicon (Si), or an alloy material or a compound material containing any of those elements as its main component by a CVD method, a sputtering method, or the like. An alloy material containing aluminum as its main component corresponds to, for example, a material which contains aluminum as its main component and also contains nickel, or an alloy material which contains aluminum as its main component and which also contains nickel and one or both carbon and silicon. The wiring 2374 preferably employs, for example, a stack-layer structure including a barrier film, an aluminum-silicon (Al—Si) film, and a barrier film, or a stack-layer structure including a barrier film, an aluminum-silicon (Al—Si) film, a titanium nitride film, and a barrier film. Note that the barrier film refers to a thin film formed of titanium, nitride of titanium, molybdenum, or nitride of molybdenum. Aluminum and aluminum silicon have low resistance and are inexpensive; therefore, they are optimal materials for forming the wiring 2374. In addition, generation of a hillock of aluminum or aluminum silicon can be prevented when upper and lower barrier layers are formed. Furthermore, when the barrier film is formed of titanium, which is an element with a high reducing property, even when a thin natural oxide film is formed on a crystalline semiconductor film, the natural oxide film can be reduced; so that preferable contact with the crystalline semiconductor film can be obtained.

Note that the structure of transistors of the present invention is not limited to the one shown in drawings. For example, a transistor with an inverted staggered structure, a FinFET structure, or the like can be used. A FinFET structure is preferable because it can suppress a short channel effect which occurs along with reduction in transistor size.

Figure 13B:
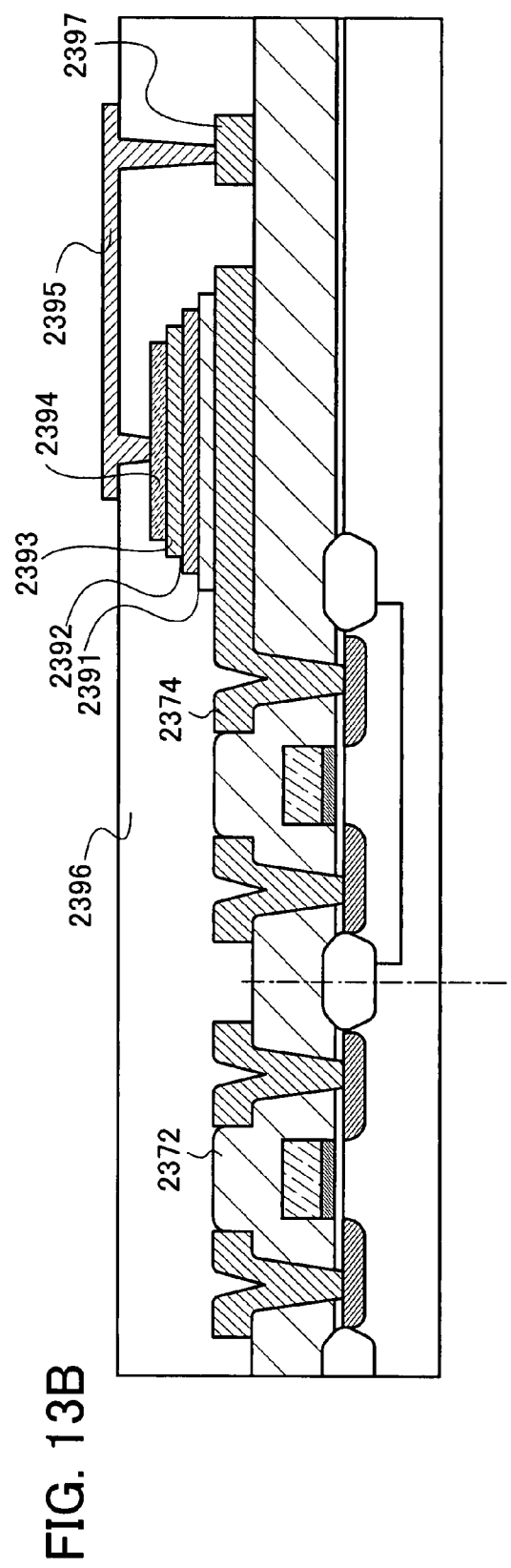

In this embodiment mode, the secondary battery is stacked over the wiring 2374 connected to the transistor. The secondary battery has a structure in which a current-collecting thin film, a negative electrode active material layer, a solid electrolyte layer, a positive electrode active material layer, and a current-collecting thin film are sequentially stacked (see FIG. 13B). Therefore, the material of the wiring 2374, which also serve as the current-collecting thin film of the secondary battery, needs to have high adhesion to the negative electrode active material layer as well as low resistance. In particular, aluminum, copper, nickel, vanadium, or the like is preferably used.

The structure of a thin-film secondary battery is described next. A negative electrode active material layer 2391 is formed over the wiring 2374. In general, vanadium oxide ($V_2O_5$) or the like is used. Next, a solid electrolyte layer 2392 is formed over the negative electrode active material layer 2391. In general, lithium phosphate ($Li_3PO_4$) or the like is used. Next, a positive electrode active material layer 2393 is formed over the solid electrolyte layer 2392. In general, lithium manganate ($LiMn_2O_4$) or the like is used. Lithium cobaltate ($LiCoO_2$) or lithium nickel oxide ($LiNiO_2$) may also be used. Next, a current-collecting thin film 2394 to serve as an electrode is formed over the positive electrode active material layer 2393. The current-collecting thin film 2394 needs to have high adhesion to the positive electrode active material layer 2393 as well as low resistance. For example, aluminum, copper, nickel, vanadium, or the like can be used.

Each of the above thin layers of the negative electrode active material layer 2391, the solid electrolyte layer 2392, the positive electrode active material layer 2393, and the current-collecting thin film 2394 may be formed by a sputtering technique or an evaporation technique. In addition, the thickness of each layer is preferably 0.1 to 3 μm.

Next, an interlayer film 2396 is formed by application of a resin. The interlayer film 2396 is etched to form a contact hole. The interlayer film is not limited to a resin, and another film such as a CVD oxide film may be used as well; however, a resin is preferably used in terms of flatness. Alternatively, the contact hole may be formed without using etching, but using a photosensitive resin. Next, a wiring layer 2395 is formed over the interlayer film 2396 and is connected to a wiring 2397. Thus, an electrical connection between the thin-film secondary battery and an element (transistor) is secured.

With the foregoing structure, the semiconductor device of the present invention can have a structure in which transistors are formed using a single crystalline substrate and a thin-film secondary battery is formed thereover. Therefore, the semiconductor device of the present invention can achieve flexibility as well as thinning and reduction in size.

Note that a method of manufacturing a semiconductor device in this embodiment mode can be applied to a semiconductor device in another embodiment mode described in this specification.

Embodiment Mode 6

In this embodiment mode, a method of manufacturing a semiconductor device, which is different from that of Embodiment Mode 5 is described with reference to drawings.

Figure 14A:
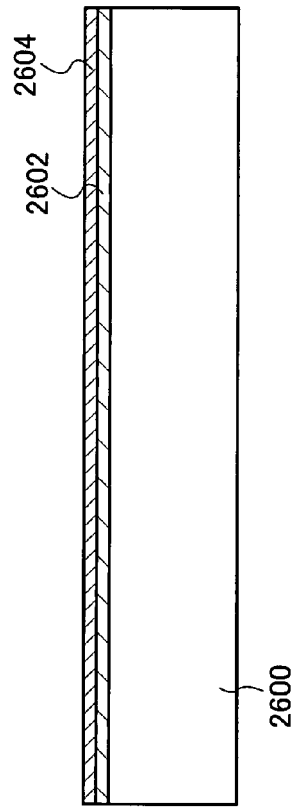
FIGS. 14A to 14C illustrate an example of a method of manufacturing a semiconductor device of the present invention.

First, an insulating film is formed over a substrate 2600. Here, a single crystal Si substrate having n-type conductivity is used as the substrate 2600, and insulating films 2602 and 2604 are formed over the substrate 2600 (see FIG. 14A). For example, a film of silicon oxide ($SiO_x$) is formed as the insulating film 2602 by application of heat treatment to the substrate 2600, and then a film of silicon nitride ($SiN_x$) is formed over the insulating film 2602 by a CVD method.

Any substrate can be used as the substrate 2600 as long as it is a semiconductor substrate. For example, a single crystal Si substrate having n-type or p-type conductivity, a compound semiconductor substrate (e.g., a GaAs substrate, an InP substrate, a GaN substrate, a SiC substrate, a sapphire substrate, or a ZnSe substrate), an SOI (silicon on insulator) substrate formed by a bonding method or a SIMOX (separation by implanted oxygen) method, or the like can be used.

Alternatively, after forming the insulating film 2602, the insulating film 2604 may be formed by nitridation of the insulating film 2602 by high-density plasma treatment. Note that the insulating film provided over the substrate 2600 may have a single-layer or stack-layer structure of three or more layers.

Figure 14B:
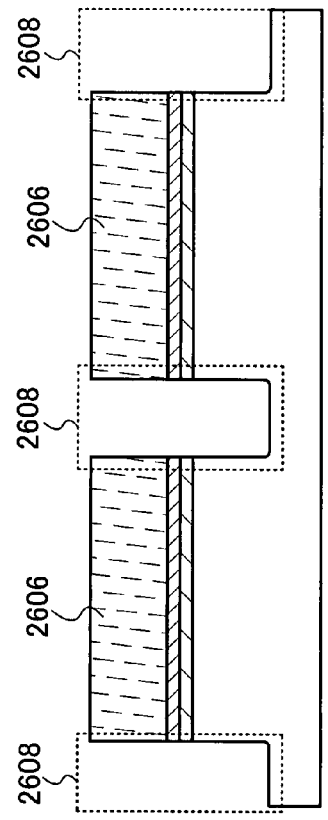

Next, patterns of a resist mask 2606 are selectively formed over the insulating film 2604, and selective etching is performed using the resist mask 2606 as a mask, so that depressions 2608 are selectively formed in the substrate 2600 (see FIG. 14B). For the etching of the substrate 2600 and the insulating films 2602 and 2604, dry etching can be carried out using plasma.

Figure 14C:
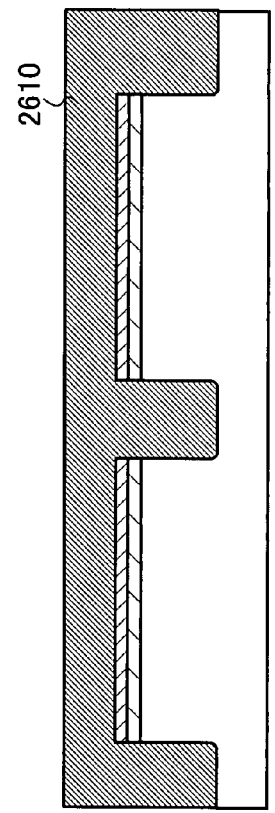

Next, the patterns of the resist mask 2606 are removed, and then an insulating film 2610 is formed so as to fill the depressions 2608 formed in the substrate 2600 (see FIG. 14C).

The insulating film 2610 is formed of an insulating material such as silicon oxide, silicon nitride, silicon oxynitride ($SiO_xN_y$, where x>y), or silicon nitride oxide ($SiN_xO_y$, where x>y) by a CVD method, a sputtering method, or the like. Here, as the insulating film 2610, a silicon oxide film is formed by an atmospheric pressure CVD method or a low-pressure CVD method using a TEOS (tetraethyl orthosilicate) gas.

Next, the surface of the substrate 2600 is exposed by grinding treatment or polishing treatment such as CMP (Chemical Mechanical Polishing). Here, by exposure of the surface of the substrate 2600, regions 2612 and 2613 are formed between insulating films 2611 which are formed in the depressions 2608 of the substrate 2600. Note that the insulating films 2611 are obtained by removing the insulating film 2610 which is formed over the surface of the substrate 2600 by grinding treatment or polishing treatment such as CMP. Then, by selective doping with a p-type impurity element, a p-well 2615 is formed in the region 2613 of the substrate 2600 (see FIG. 15A).

As a p-type impurity element, boron (B), aluminum (Al), gallium (Ga), or the like can be used. Here, boron (B) is introduced into the region 2613 as the impurity element.

In this embodiment mode, although the region 2612 is not doped with an impurity element because a semiconductor substrate having n-type conductivity is used as the substrate 2600, an n-well may be formed in the region 2612 by doping with an n-type impurity element. As an n-type impurity element, phosphorus (P), arsenic (As), or the like can be used.

When a semiconductor substrate having p-type conductivity is used, on the other hand, the region 2612 may be doped with an n-type impurity element to form an n-well, whereas the region 2613 may be doped with no impurity element.

Next, insulating films 2632 and 2634 are formed so as to cover the regions 2612 and 2613, respectively in the substrate 2600 (see FIG. 15B).

For example, surfaces of the regions 2612 and 2613 provided in the substrate 2600 are oxidized by heat treatment, so that the insulating films 2632 and 2634 can be formed of silicon oxide films. Alternatively, the insulating films may be formed to have a stack-layer structure of a silicon oxide film and a film containing oxygen and nitrogen (a silicon oxynitride film) by forming a silicon oxide film by a thermal oxidation method and then nitriding the surface of the silicon oxide film by nitridation treatment.

Further alternatively, the insulating films 2632 and 2634 may be formed by plasma treatment as described above. For example, the insulating films 2632 and 2634 can be formed using a silicon oxide ($SiO_x$) film or a silicon nitride ($SiN_x$) film which is obtained by application of oxidation or nitridation treatment using high-density plasma treatment to the surfaces of the regions 2612 and 2613 provided in the substrate 2600. Furthermore, after applying oxidation treatment using high-density plasma to the surfaces of the regions 2612 and 2613, nitridation treatment using high-density plasma may be performed. In that case, silicon oxide films are formed on the surfaces of the regions 2612 and 2613, and then silicon oxynitride films are formed on the silicon oxide films. Thus, the insulating films 2632 and 2634 are each formed to have a stack-layer structure including the silicon oxide film and the silicon oxynitride film. After the silicon oxide films are formed on the surfaces of the regions 2612 and 2613 by a thermal oxidation method, oxidation or nitridation treatment using high-density plasma may be applied to the silicon oxide films.

The insulating films 2632 and 2634 formed over the regions 2612 and 2613 in the substrate 2600 serve as the gate insulating films of transistors which are completed later.

Next, a conductive film is formed so as to cover the insulating films 2632 and 2634, which are formed over the regions 2612 and 2613 provided in the substrate 2600, respectively (see FIG. 15C). Here, an example is shown in which the conductive film is formed by sequentially stacking conductive films 2636 and 2638. Needless to say, the conductive film may be formed to have a single layer or a stack-layer structure of three or more layers.

As materials of the conductive films 2636 and 2638, an element selected from tantalum (Ta), tungsten (W), titanium (Ti), molybdenum (Mo), aluminum (Al), copper (Cu), chromium (Cr), niobium (Nb), and the like, or an alloy material or a compound material containing any of those elements as its main component can be used. Alternatively, a metal nitride film obtained by nitridation of any of those elements can be used. Further alternatively, a semiconductor material typified by polycrystalline silicon doped with an impurity element such as phosphorus can be used.

Here, a stack-layer structure is provided including the conductive film 2636 formed using tantalum nitride and the conductive film 2638 formed thereon using tungsten. Alternatively, the conductive film 2636 can be formed to have a single-layer or stack-layer film using any of tantalum nitride, tungsten nitride, molybdenum nitride, or titanium nitride, and the conductive film 2638 can be formed to have a single-layer or stack-layer film using any of tungsten, tantalum, molybdenum, or titanium.

Figure 16A:
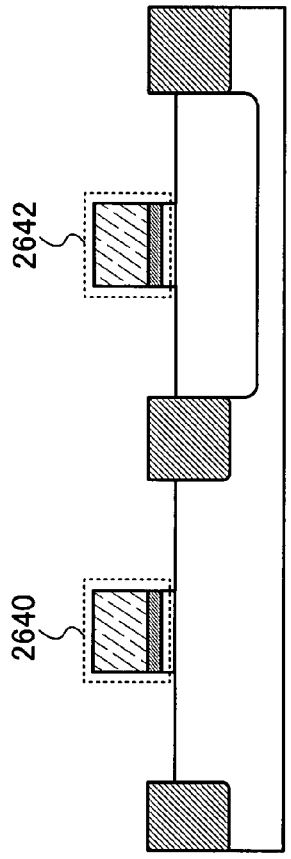
FIGS. 16A to 16C illustrate an example of a method of manufacturing a semiconductor device of the present invention.

Next, the stacked conductive films 2636 and 2638 are selectively removed by etching, so that the conductive films 2636 and 2638 remain above parts of the regions 2612 and 2613 in the substrate 2600. Thus, conductive films 2640 and 2642 each of which serves as a gate electrode are formed (see FIG. 16A). Here, surfaces of the regions 2612 and 2613 of the substrate 2600 which do not overlap with the conductive films 2640 and 2642 respectively are exposed.

Specifically, in the region 2612 in the substrate 2600, a part of the insulating film 2632 which is formed below the conductive film 2640 and does not overlap with the conductive film 2640, is selectively removed, so that the ends of the conductive film 2640 and the ends of the insulating film 2632 are almost aligned with each other. In addition, in the region 2613 in the substrate 2600, a part of the insulating film 2634 which is formed below the conductive film 2642 and does not overlap with the conductive film 2642, is selectively removed, so that the ends of the conductive film 2642 and the ends of the insulating film 2634 are almost aligned with each other.

In this case, the part of the insulating films or the like which do not overlap with the conductive films 2640 and 2642 may be removed at the same time as the formation of the conductive films 2640 and 2642. Alternatively, the part of the insulating films which do not overlap with the conductive films 2640 and 2642 may be removed using resist masks which are left after the formation of the conductive films 2640 and 2642 or using the conductive films 2640 and 2642 as masks.

Figure 16B:
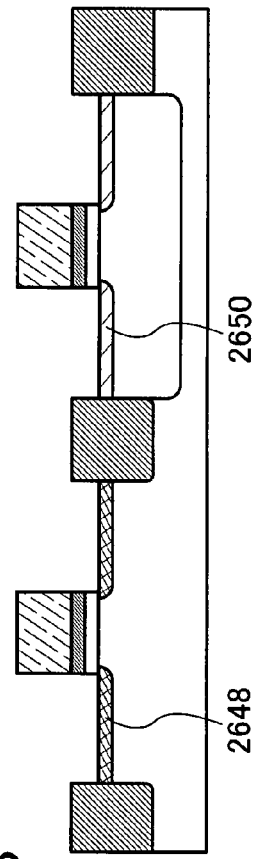

Next, the regions 2612 and 2613 in the substrate 2600 are doped with an impurity element (see FIG. 16B). Here, the region 2613 is selectively doped with an n-type impurity element at low concentration, using the conductive film 2642 as a mask, to form low concentration impurity regions 2650, whereas the region 2612 is selectively doped with a p-type impurity element at low concentration, using the conductive film 2640 as a mask, to form low concentration impurity regions 2648. As an n-type impurity element, phosphorus (P), arsenic (As), or the like can be used. As a p-type impurity element, boron (B), aluminum (Al), gallium (Ga), or the like can be used.

Next, sidewalls 2654 are formed so as to be in contact with the side surfaces of the conductive films 2640 and 2642. Specifically, the insulating film is formed to have a single layer or stack layer of a film containing an inorganic material such as silicon, oxide of silicon, or nitride of silicon, or a film containing an organic material such as an organic resin, by a plasma CVD method, a sputtering method, or the like. Then, the insulating film is selectively etched by anisotropic etching mainly in the perpendicular direction, so that the sidewalls 2654 which are in contact with side surfaces of the conductive films 2640 and 2642 are formed. The sidewalls 2654 are used as masks in doping for forming lightly doped drain (LDD) regions. In addition, the sidewalls 2654 are formed to be in contact with side surfaces of the insulating films formed below the conductive films 2640 and 2642.

Figure 16C:
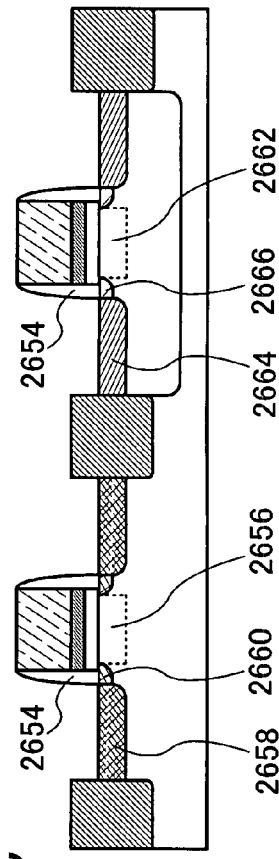

Next, the regions 2612 and 2613 in the substrate 2600 are doped with an impurity element, using the sidewalls 2654 and the conductive films 2640 and 2642 as masks, so that impurity regions which serve as source and drain regions are formed (see FIG. 16C). At this time, the region 2613 in the substrate 2600 is doped with an n-type impurity element at high concentration, using the sidewalls 2654 and the conductive film 2642 as masks, whereas the region 2612 is doped with a p-type impurity element at high concentration, using the sidewalls 2654 and the conductive film 2640 as masks.

In this manner, impurity regions 2658 which form source and drain regions, low concentration impurity regions 2660 which form LDD regions, and a channel formation region 2656 are formed in the region 2612 in the substrate 2600. Meanwhile, impurity regions 2664 which form source and drain regions, low concentration impurity regions 2666 which form LDD regions, and a channel formation region 2662 are formed in the region 2613 in the substrate 2600.

In this embodiment mode, the impurity elements are introduced under the condition in which parts of the regions 2612 and 2613 in the substrate 2600 which do not overlap with the conductive films 2640 and 2642 are exposed. Accordingly, the channel formation regions 2656 and 2662 which are formed in the regions 2612 and 2613 in the substrate 2600, respectively, can be formed in a self-aligned manner, due to the conductive films 2640 and 2642.

Figure 17A:
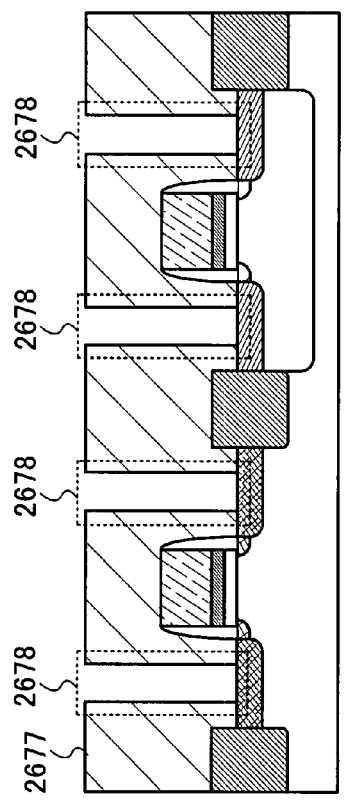
FIGS. 17A and 17B illustrate an example of a method of manufacturing a semiconductor device of the present invention.

Next, an insulating film 2677 is formed so as to cover the insulating films, the conductive films, and the like which are provided over the regions 2612 and 2613 of the substrate 2600, and opening portions 2678 are formed in the insulating film 2677 (see FIG. 17A).

The insulating film 2677 can be formed to have a single-layer or stack-layer structure of an insulating film containing oxygen and/or nitrogen such as silicon oxide ($SiO_x$), silicon nitride ($SiN_x$), silicon oxynitride ($SiO_xN_y$) (x>y), or silicon nitride oxide ($SiN_xO_y$) (x>y), a film containing carbon such as DLC (Diamond-Like Carbon), a film of an organic material such as epoxy, polyimide, polyamide, polyvinyl phenol, benzocyclobutene, or acrylic, or a film of a siloxane material such as a siloxane resin, which are formed by a CVD method, a sputtering method, or the like. Note that a siloxane material refers to a material including a Si—O—Si bond. Siloxane has a skeleton structure containing a bond of silicon (Si) and oxygen (O). As a substituent, an organic group containing at least hydrogen (e.g., an alkyl group or aromatic hydrocarbon) is used. Alternatively, a fluoro group can be used as the substituent. Further alternatively, both an organic group containing at least hydrogen and a fluoro group may be used as the substituent.

Figure 17B:
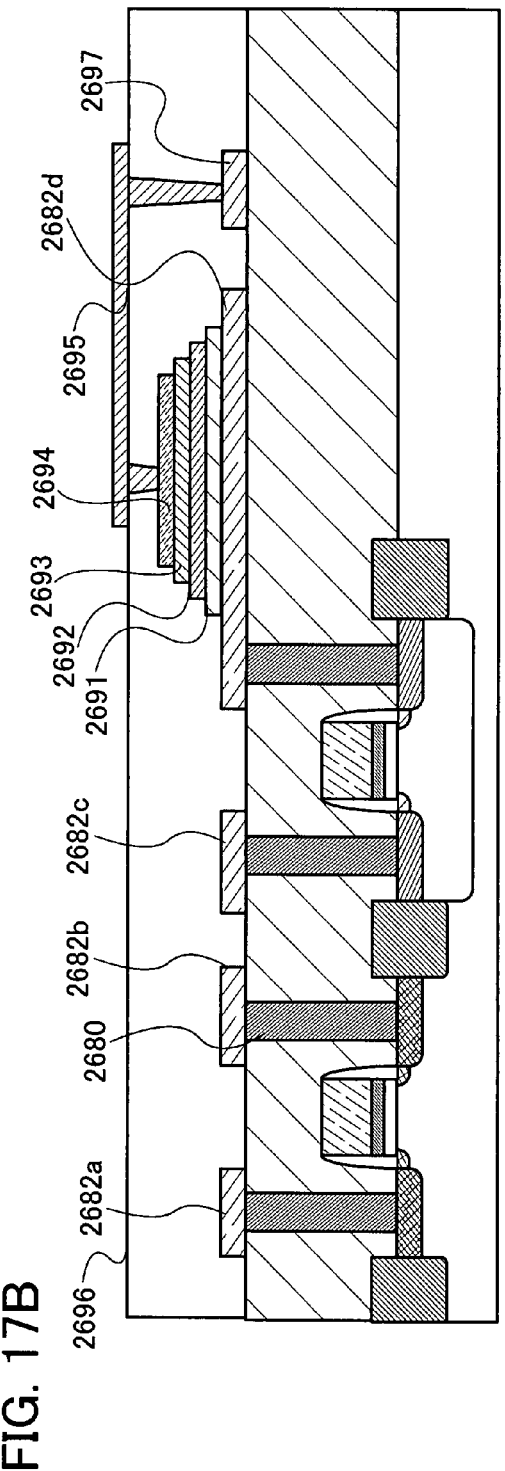

Next, conductive films 2680 are formed in the opening portions 2678 by a CVD method and conductive films 2682a to 2682d are selectively formed over the insulating film 2677 so as to be electrically connected to the conductive films 2680 (see FIG. 17B).

The conductive films 2680 and 2682a to 2682d are formed to have a single layer or stack layer of an element selected from, aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), and silicon (Si), or an alloy material or a compound material containing any of those elements as its main component by a CVD method, a sputtering method, or the like. An alloy material containing aluminum as its main component corresponds to, for example, a material which contains aluminum as its main component and also contains nickel, or an alloy material which contains aluminum as its main component and which also contains nickel and one or both carbon and silicon. The conductive films 2680 and 2682a to 2682d preferably employ, for example, a stack-layer structure including a barrier film, an aluminum-silicon (Al—Si) film, and a barrier film, or a stack-layer structure including a barrier film, an aluminum-silicon (Al—Si) film, a titanium nitride film, and a barrier film. Note that the barrier film refers to a thin film formed of titanium, nitride of titanium, molybdenum, or nitride of molybdenum. Aluminum and aluminum silicon have low resistance and are inexpensive; therefore, they are optimal materials for forming the conductive films 2680 and 2682a to 2682d. In addition, generation of a hillock of aluminum or aluminum silicon can be prevented when upper and lower barrier layers are formed. Furthermore, in the case where the barrier film is formed by using titanium, which is an element with a high reducing property, even when a thin natural oxide film is formed on a crystalline semiconductor film, the natural oxide film can be reduced; so that preferable contact with the crystalline semiconductor film can be obtained. Here, the conductive film 2680 and 2682a to 2682d can be formed by selectively growing tungsten (W) by a CVD method.

Through the foregoing steps, a p-channel thin film transistor and an n-channel thin film transistor formed in the regions 2612 and 2613 in the substrate 2600, respectively can be obtained.

Note that the structure of transistors of the present invention is not limited to the one shown in drawings. For example, a transistor with an inverted staggered structure, a FinFET structure, or the like can be used. A FinFET structure is preferable because it can suppress a short channel effect which occurs along with reduction in transistor size.

In this embodiment mode, the secondary battery is stacked over the conductive film 2682d connected to the transistor. The secondary battery has a structure in which a current-collecting thin film, a negative electrode active material layer, a solid electrolyte layer, a positive electrode active material layer, and a current-collecting thin film are sequentially stacked (see FIG. 17B). Therefore, the material of the conductive film 2682d, which also serve as the current-collecting thin film of the secondary battery, needs to have high adhesion to the negative electrode active material layer as well as low resistance. In particular, aluminum, copper, nickel, vanadium, or the like is preferably used.

The structure of a thin-film secondary battery is described next. A negative electrode active material layer 2691 is formed over the conductive film 2682d. In general, vanadium oxide ($V_2O_5$) or the like is used. Next, a solid electrolyte layer 2692 is formed over the negative electrode active material layer 2691. In general, lithium phosphate ($Li_3PO_4$) or the like is used. Next, a positive electrode active material layer 2693 is formed over the solid electrolyte layer 2392. In general, lithium manganate ($LiMn_2O_4$) or the like is used. Lithium cobaltate ($LiCoO_2$) or lithium nickel oxide ($LiNiO_2$) may also be used. Next, a current-collecting thin film 2694 to serve as an electrode is formed over the positive electrode active material layer 2693. The current-collecting thin film 2694 needs to have high adhesion to the positive electrode active material layer 2693 as well as low resistance. For example, aluminum, copper, nickel, vanadium, or the like can be used.

Each of the above thin layers of the negative electrode active material layer 2691, the solid electrolyte layer 2692, the positive electrode active material layer 2693, and the current-collecting thin film 2694 may be formed by a sputtering technique or an evaporation technique. In addition, the thickness of each layer is preferably 0.1 to 3 µm.

Next, an interlayer film 2696 is formed by application of a resin. The interlayer film 2696 is etched to form a contact hole. The interlayer film 2696 is not limited to a resin, and another film such as a CVD oxide film may be used as well; however, a resin is preferably used in terms of flatness. Alternatively, the contact hole may be formed without using etching, but using a photosensitive resin. Next, a wiring layer 2695 is formed over the interlayer film 2696 and is connected to a wiring 2697. Thus, an electrical connection of the thin-film secondary battery is secured.

With the foregoing structure, the semiconductor device of the present invention can have a structure in which transistors are formed using a single crystalline substrate and a thin-film secondary battery is formed thereover. Therefore, the semiconductor device of the present invention can achieve flexibility as well as thinning and reduction in size.

Note that a method of manufacturing a semiconductor device in this embodiment mode can be applied to a semiconductor device in another embodiment mode described in this specification.

Embodiment Mode 7

In this embodiment, uses of an RFID tag, which is an example of a usage mode of a semiconductor device which is capable of transmitting and receiving information wirelessly is described. An RFID tag can be included in, for example, bills, coins, securities, bearer bonds, documents (e.g., driver's licenses or resident's cards), packaging containers (e.g., wrapping paper or bottles), storage media (e.g., DVD software or video tapes), vehicles (e.g., bicycles), personal belongings (e.g., bags or glasses), foods, plants, animals, human bodies, clothing, everyday articles, products such as electronic appliances, identification tags on luggage, and the like. An RFID tag can be used as a so-called ID label, ID tag, or ID card. An electronic appliance refers to a liquid crystal display device, an EL display device, a television set (also called simply a television, a TV receiver, or a television receiver), a mobile phone, or the like. Hereinafter, applications of the present invention and examples of products which include an application of the present invention are described with reference to FIGS. 23A to 23E.

Figure 23A:
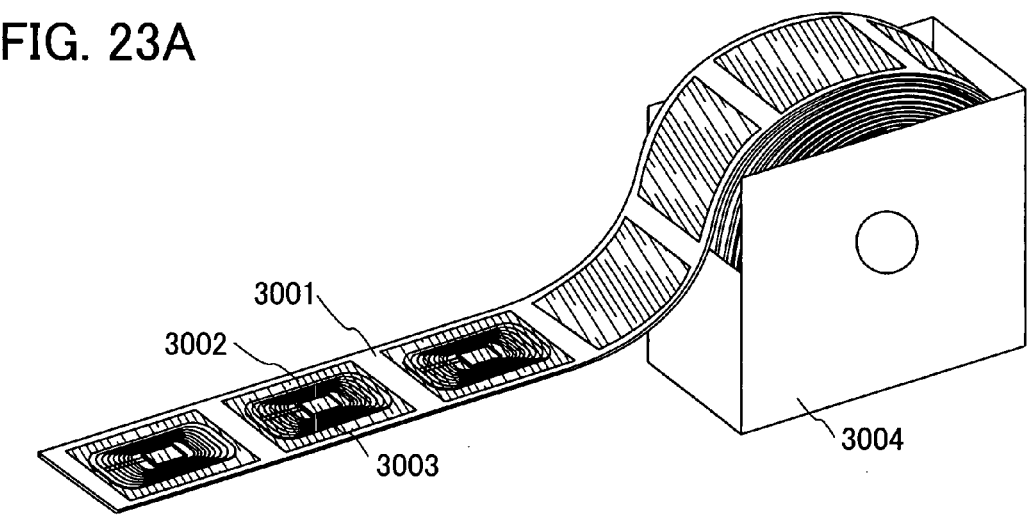
FIGS. 23A to 23E each illustrate an example of mode of usage of a semiconductor device of the present invention.

FIG. 23A shows an example of completed RFID tags relating to the present invention. A plurality of ID labels 3003 each including an RFID tag 3002 are formed on a label board 3001 (separate paper). The ID labels 3003 are stored in a box 3004. On the ID label 3003, there is information about a product or service (a product name, a brand, a trademark, a trademark owner, a seller, a manufacturer, or the like). Meanwhile, an ID number that is unique to the product (or the type of product) is assigned to the included RFID tag 3002, so that illegal behavior, such as forgery, infringement of intellectual property rights like patent rights and trademark rights, or unfair competition can easily be detected. In addition, a large amount of information that cannot be clearly shown on a container or the label of the product, for example, production area, selling area, quality, raw materials, efficacy, use, quantity, shape, price, production method, method of use, time of production, time of use, expiration date, instructions for the product, information about the intellectual property of the product, or the like, can be inputted to the RFID tag 3002 so that a client or a consumer can access the information using a simple reader. In addition, the RFID tag has a structure such that the producer of a product can easily rewrite, erase, or the like the information, but a client or a consumer cannot. Note that the RFID tag may have a display portion to display the information.

Figure 23B:
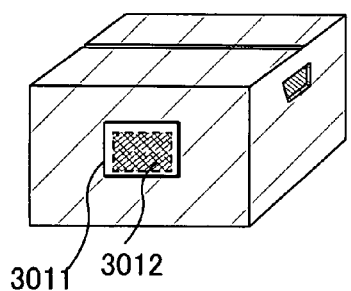

FIG. 23B shows a label-shaped RFID tag 3011 which includes an RFID tag 3012. When a product is provided with the RFID tag 3011, product management can be simplified. For example, in the case where the product is stolen, the product can be traced, so the culprit can be identified quickly. Thus, by providing products with the RFID tags, products that are superior in so-called traceability can be distributed.

Figure 23C:
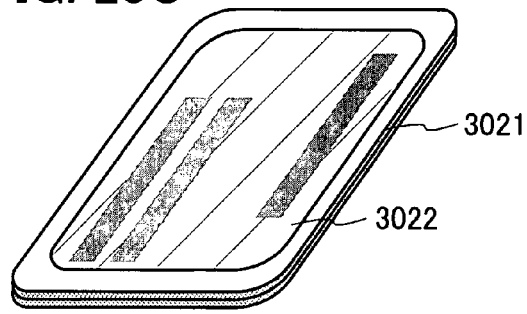

FIG. 23C shows an example of a completed ID card 3021 including an RFID tag 3022. The ID card 3021 may be any kind of card: a cash card, a credit card, a prepaid card, an electronic ticket, electronic money, a telephone card, a membership card, or the like. Further, the ID card 3021 may have a display portion on its surface to display various kinds of information.

Figure 23D:
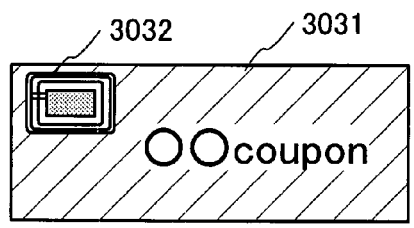

FIG. 23D shows a completed bearer bond 3031. An RFID tag 3032 is embedded in the bearer bond 3031 and is protected by a resin which is formed in the periphery of the RFID tag. Here, the resin is filled with a filler. The bearer bond 3031 can be formed in the same manner as an RFID tag of the present invention. Note that the aforementioned bearer bond may be a stamp, a ticket, an admission ticket, a merchandise coupon, a book coupon, a stationery coupon, a beer coupon, a rice coupon, various types of gift coupon, various types of service coupon, or the like. Needless to say, the bearer bond is not limited thereto. When the RFID tag 3032 of the present invention is provided in bills, coins, securities, bearer bonds, documents, or the like, an authentication function can be provided, and by using the authentication function, forgery can be prevented.

Figure 23E:
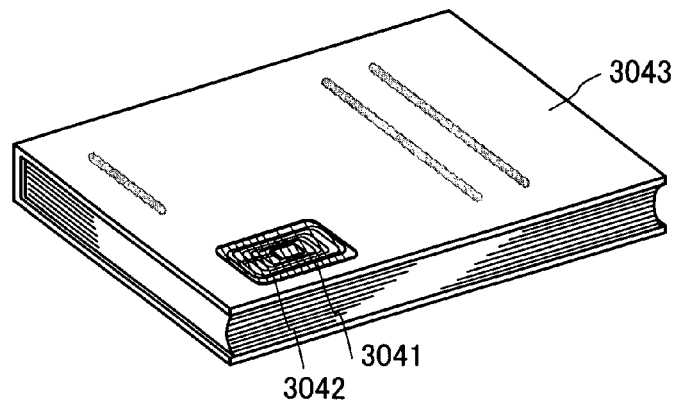

FIG. 23E shows a book 3043 to which an ID label 3041 which includes an RFID tag 3042 is attached. The RFID tag 3042 of the present invention is firmly attached in or on goods by being attached to a surface or embedded, for example. As shown in FIG. 23E, the RFID tag 3042 can be embedded in the paper of a book, or embedded in an organic resin of a package. Because the RFID tag 3042 of the present invention can be small, thin, and lightweight, it can be firmly attached to or in goods without spoiling their design.

Although not illustrated here, the efficiency of a system such as an inspection system can be improved by providing the RFID tags of the present invention in, for example, packaging containers, storage media, personal belongings, foods, clothing, everyday articles, electronic appliances, or the like. Further, a vehicle is provided with the RFID tag, counterfeit and theft can be prevented. Furthermore, living things such as animals can be easily identified by implanting the individual living things with RFID tags. For example, year of birth, sex, breed, and the like can be easily recognized by implanting wireless tags in living things such as domestic animals.

Figure 24A:
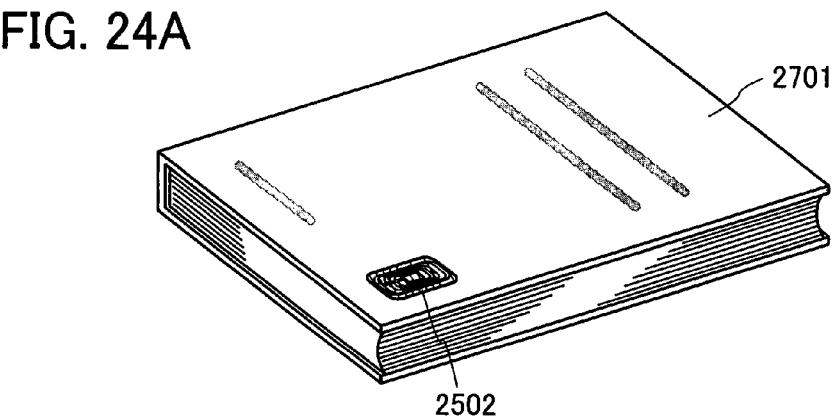
FIGS. 24A to 24D each illustrate an example of mode of usage of a semiconductor device of the present invention.
Figure 24B:
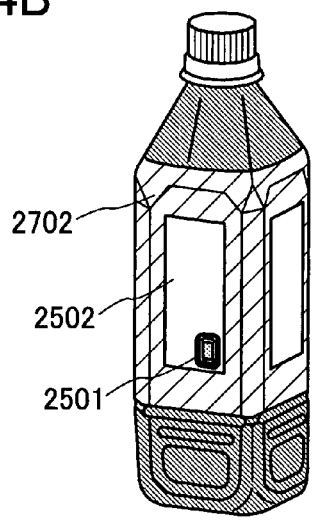

FIGS. 24A and 24B show a book 2701 and a plastic bottle 2702 to which ID labels 2502 which include an RFID tag 2501 of the present invention are attached. Because the RFID tag 2501 that is used in the present invention is very thin, when the ID label 2502 is mounted on goods such as the book, function and design of the goods are not spoiled. Further, in the case of a non-contact type thin film integrated circuit device, an antenna and a chip can be formed over the same substrate and the non-contact type thin film integrated circuit device can be directly transferred to a product which has a curved surface easily.

Figure 24C:
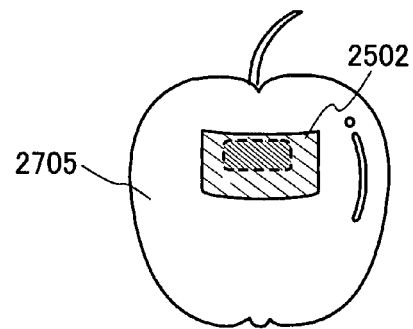
Figure 24D:
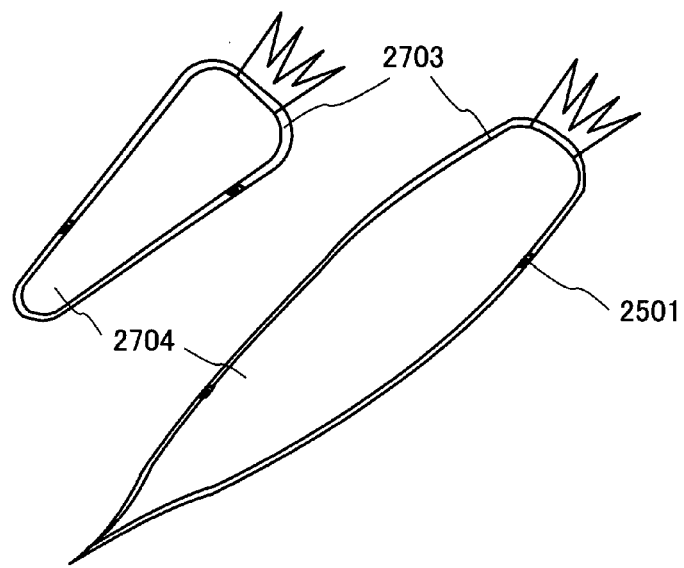

FIG. 24C shows the ID label 2502 which includes the RFID tag 2501 directly attached to fresh food, which is a piece of fruit 2705. Further, FIG. 24D shows examples of fresh food, vegetables 2704, wrapped in a wrapping film. Note that in the case of attaching a RFID tag 2501 to a product, it is possible that the RFID tag 2501 might be taken off; however, in the case of wrapping the product with a wrapping film 2703, it is difficult to take off the wrapping film 2703. Therefore, to some extent, there is an advantage in preventing crimes. Note that a semiconductor device of the present invention can be applied to all kinds of products besides the above-mentioned ones.

Note that a structure of an RFID tag in this embodiment mode can be implemented by being combined with a structure of a semiconductor device in another embodiment mode described in this specification.

This application is based on Japanese Patent Application serial no. 2006-320469 filed in Japan Patent Office on Nov. 28, 2006, the entire contents of which are hereby incorporated by reference.

What is claimed is:

1. A semiconductor device comprising:
    an antenna circuit;
    a communication control circuit to conduct wireless communication via the antenna circuit;
    a battery to be charged with electric power which is wirelessly fed via the antenna circuit;
    a comparison arithmetic circuit to compare a state of charge of the battery and a state of charge of a battery of a wireless communication sender; and
    an oscillator circuit which wirelessly feeds electric power to the battery of the wireless communication sender.

2. A semiconductor device according to claim 1, further comprising:
    a data converter circuit to convert the state of charge of the battery into a digital value,
    wherein the digital value is inputted into the comparison arithmetic circuit.

3. A semiconductor device according to claim 1,
    wherein the antenna circuit, the communication control circuit, the battery, the comparison arithmetic circuit and the oscillator circuit are provided over a substrate.

4. A semiconductor device according to claim 1, wherein the communication control circuit includes a demodulation circuit, a modulation circuit, a logic circuit and a memory circuit.

5. A semiconductor device according to claim 1,
    wherein the battery is any one of a lithium battery, a nickel metal hydride battery and a double-layer electrolytic capacitor.

6. A semiconductor device comprising:
    a first antenna circuit;
    a second antenna circuit;
    a communication control circuit to conduct wireless communication via the first antenna circuit;
    a battery to be charged with electric power wirelessly fed via the second antenna circuit;
    a comparison arithmetic circuit to compare a state of charge of the battery and a state of charge of a battery of a wireless communication sender; and
    an oscillator circuit which wirelessly feeds electric power to the battery of the wireless communication sender via the second antenna circuit.

7. A semiconductor device according to claim 6, further comprising:
- a data converter circuit to convert the state of charge of the battery into a digital value,
- wherein the digital value is inputted into the comparison arithmetic circuit.

8. A semiconductor device according to claim 6,
- wherein a shape of a first antenna provided in the first antenna circuit and a shape of a second antenna provided in the second antenna circuit are different from each other.

9. A semiconductor device according to claim 8,
- wherein one of the shape of the first antenna and the shape of the second antenna has a coil-shape.

10. A semiconductor device according to claim 6,
- wherein the first antenna circuit, the second antenna circuit, the communication control circuit, the battery, the comparison arithmetic circuit and the oscillator circuit are provided over a substrate.

11. A semiconductor device according to claim 6,
- wherein the communication control circuit includes a demodulation circuit, a modulation circuit, a logic circuit and a memory circuit.

12. A semiconductor device according to claim 6,
- wherein the battery is any one of a lithium battery, a nickel metal hydride battery and a double-layer electrolytic capacitor.

13. A battery charge method for a plurality of semiconductor devices wherein each of the plurality of semiconductor devices includes an antenna circuit, a communication control circuit to conduct wireless communication via the antenna circuit, a battery to be charged with electric power which is wirelessly fed via the antenna circuit, the battery charge method comprising steps of:
- comparing a difference between voltages of each of the batteries of the plurality of semiconductor devices communicating with each other;
- feeding and receiving electric power of the battery between the plurality of semiconductor devices communicating with each other.

14. A battery charge method according to claim 13,
- wherein the antenna circuit, the communication control circuit and the battery are provided over a substrate.

15. A battery charge method according to claim 13,
- wherein the communication control circuit includes a demodulation circuit, a modulation circuit, a logic circuit and a memory circuit.

16. A battery charge method according to claim 13,
- wherein the battery is any one of a lithium battery, a nickel metal hydride battery and a double-layer electrolytic capacitor.

* * * * *